United States Patent [19]

Omae et al.

[11] Patent Number: 5,299,289

[45] Date of Patent: Mar. 29, 1994

[54] POLYMER DISPERSED LIQUID CRYSTAL PANEL WITH DIFFRACTION GRATING

[75] Inventors: Hideki Omae, Suita; Hirosi Takahara, Neyagawa; Takaaki Tanaka, Katano, all of Japan

[73] Assignee: Matsushita Electric Industrial Co., Ltd., Osaka, Japan

[21] Appl. No.: 896,967

[22] Filed: Jun. 11, 1992

[30] Foreign Application Priority Data

| Jun. 11, 1991 | [JP] | Japan | 3-139113 |
| Jun. 11, 1991 | [JP] | Japan | 3-139114 |
| Sep. 25, 1991 | [JP] | Japan | 3-245601 |
| Sep. 27, 1991 | [JP] | Japan | 3-249012 |
| Sep. 27, 1991 | [JP] | Japan | 3-249016 |
| Sep. 27, 1991 | [JP] | Japan | 3-249020 |

[51] Int. Cl.$^5$ .......................... G02F 1/137; G02F 1/13
[52] U.S. Cl. .......................................... 359/95; 359/94; 359/51
[58] Field of Search .................. 359/95, 94, 51, 52, 359/66, 74, 72; 353/20, 31, 33, 38

[56] References Cited

U.S. PATENT DOCUMENTS

| 3,843,231 | 10/1974 | Borel et al. | 359/95 X |
| 4,060,316 | 11/1977 | Pollade et al. | 359/45 X |
| 4,127,322 | 11/1978 | Jacobson et al. | 359/71 X |
| 4,389,096 | 6/1983 | Hori et al. | 359/72 X |
| 4,606,611 | 8/1986 | Ferguson | 359/52 |
| 4,673,255 | 6/1987 | West et al. | 359/51 |
| 4,729,640 | 3/1988 | Sakata | 359/79 X |
| 4,751,509 | 7/1988 | Kubota et al. | 359/95 X |
| 4,850,682 | 7/1989 | Gerritser | 359/58 |
| 4,856,869 | 8/1989 | Sakata et al. | 359/94 |
| 5,013,141 | 5/1991 | Sakata | 359/94 X |
| 5,056,912 | 10/1991 | Hamada et al. | 359/64 X |
| 5,096,282 | 3/1992 | Margerum et al. | 359/3 |
| 5,103,327 | 4/1992 | Hirai et al. | 359/51 |
| 5,107,357 | 4/1992 | Cassarly et al. | 359/94 |
| 5,148,302 | 9/1992 | Nayano et al. | 359/95 |

*Primary Examiner*—William L. Sikes
*Assistant Examiner*—Kenneth Parker
*Attorney, Agent, or Firm*—Wenderoth, Lind & Ponack

[57] ABSTRACT

A layer having an irregular sectional surface is formed on the surface of at least one of a pixel electrode and confronting electrode of a liquid crystal layer so as to confront a liquid crystal layer. The liquid crystal layer is formed of a polymer dispersed liquid crystal. If the layer having an irregular sectional surface is formed in a convex and concave pattern regularly and cyclically, the thus formed layer serves as a diffraction grating. When the liquid crystal is in an OFF condition, the refractive index n of the diffraction grating is different from the refractive index of the liquid crystal layer. As a result, an incident light to the liquid crystal panel is scattered and at the same time, diffracted. When the liquid crystal in in an ON condition, there is no difference in the refractive index between the diffraction grating and the liquid crystal, and the incident light passes straight through. Using the liquid crystal panel as a light valve, the light from a light source is incident to the liquid crystal panel, and the image formed on the liquid crystal panel is projected through a projection lens onto a screen. In the case of a black display, the incident light is scattered or diffracted in the liquid crystal panel according to the projected image. The scattered or diffracted light is stopped by a light shielding part of a aperture, and thus does not arrive at the screen.

46 Claims, 17 Drawing Sheets

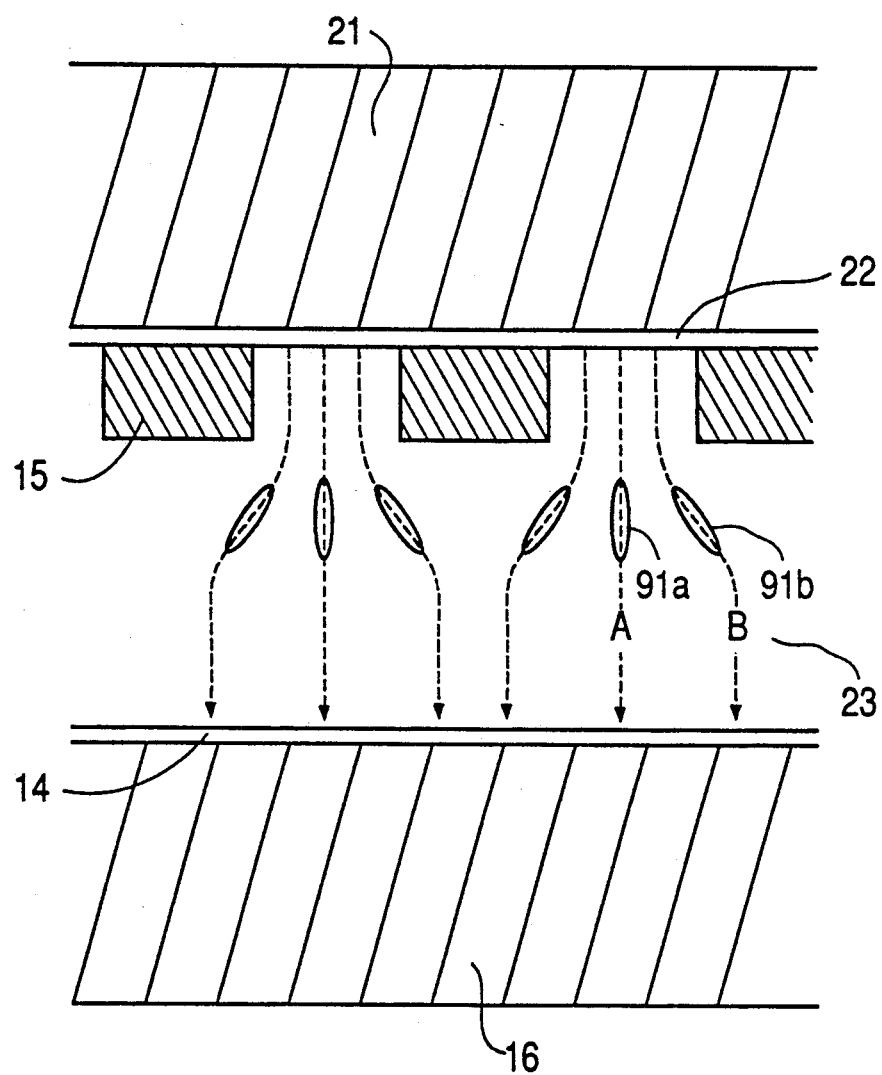

211

POLYMER DISPERSED LIQUID CRYSTAL PANEL WITH DIFFRACTION GRATING

BACKGROUND OF THE INVENTION

1. Field of the Invention

This invention relates to a liquid crystal projection apparatus for extensible projecting an image displayed mainly on a small-sized liquid crystal panel and to a liquid crystal panel mainly using in said liquid crystal projection apparatus.

2. Description of the Prior Art

Research and developmental activities have been accelerated on liquid crystal display apparatus because they offer a large number of advantages such as light weight, thin structure and the like. On the other hand, however, they are disadvantageously difficult to be made into a large display area. Under such a circumstance, a liquid crystal projection type television in which a displayed image of a small-sized liquid crystal panel is extensible projected with a projection lens to obtain a large picture thereof has suddenly been watched with keen interest recently. A liquid crystal projection type television now being sold uses a twisted pneumatic (hereinafter called a TN) liquid crystal panel in which a rotary polarization characteristic of the liquid crystal is utilized.

First, an explanation follows on a general liquid crystal panel. A conventional TN liquid crystal panel uses two polarizers. The operation thereof will be explained below.

An incident light is passed through and incident side polarizer to become an undirectionally polarized light and enters into a liquid crystal panel. When the liquid crystal is in the OFF condition, the incident light is rotated by 90 degrees, and when the liquid crystal panel is in the ON condition, it is transmitted therethrough with no rotation. As a result, if the polarizers on the incident side and exit side are orthogonal in polarization direction, when the panel is in the OFF condition, the light will be transmitted, and if the panel is in the ON condition, it will be stopped. However, if the polarization directions of the two polarizers are parallel to each other, the inverse phenomena can be obtained. As shown above, the conventional liquid crystal panel modulates a light to display an image.

Next, a conventional liquid crystal projection apparatus will be explained below, which comprises a light omitting means such as a light condensing optical system or the like, an infrared cut mirror for transmitting the infrared rays, a blue light reflecting dichroic mirror (hereinafter called a BDM), a green light reflecting dichroic mirror (hereinafter called a GDM), a red light reflecting dichroic mirror (hereinafter called a RDM), an optical component such as a projection lens system or the like, three sets of incident and exit side polarizers disposed correspondingly to the blue, green and red light, and a conventional TN liquid crystal panel. With the apparatus composed as above, the operation will be explained below.

First, a white light emitted from the light condensing optical system has a blue light (hereinafter called a B-light) reflected by the BDM and sent to the polarizer. The light that has passed through the BDM has a green light (hereinafter called a G-light) reflected by the GDM, and a red light (hereinafter called a R-light) reflected by the RDM and sent to the corresponding polarizers. The polarizers each transmit only one light of the longitudinal wave component and the transversal wave component of the corresponding one of the blue, green and red lights to align the direction of polarization with each other and sent to the corresponding liquid crystal panel. In this case, more than 50% of the light will be absorbed by the polarizers, which means that the brightness of the transmitted light will be below one half of the maximum value.

Each liquid crystal panel modulates the transmitted light in response to a video signal. The modulated light is passed through the corresponding polarizer according to the modulation degree and sent to the corresponding projection lens system for extensible projecting on the projection screen.

As is clear from the above explanations, a liquid crystal panel using a TN liquid crystal requires a linearly polarized light incident to the liquid crystal panel. Accordingly, polarizers must be disposed on the front and back sides of the liquid crystal panel. The above-described polarizers absorb more than 60% of the light on a theoretical basis. As a result, there arises such a problem in that when extensible projected on the projection screen, only a low luminance picture can be obtained.

As a liquid crystal panel using no polarizer and a liquid crystal projection apparatus using such a panel, an element having a pneumatic liquid crystal and a diffraction grating in combination is proposed in U.S. Pat. No. 4,389,096 or the like; however, it is difficult to align the liquid crystal molecules if an irregularity such as that caused by the diffraction grating having a small pitch as well as having a height is formed on the surface of a substrate.

In order to overcome these problems, this invention uses a polymer dispersed liquid crystal. A liquid crystal panel using the polymer dispersed liquid crystal has a much improved light application efficiency because no polarizer is needed. Because of no need to control alignment, even if the substrate has an irregularity caused by a diffraction grating, no problem arises.

A brief description follows on a polymer dispersed liquid crystal. The polymer dispersed liquid crystal can be broadly classified into two types depending on the liquid crystal and the dispersed condition thereof. One is a type that droplet-shaped liquid crystal particles are dispersed into a polymer, that is, the liquid crystal exists the polymer in a discontinuous condition. This is hereinafter called a PDLC, and a liquid crystal panel using such a type of liquid crystal is called a PD liquid crystal panel hereinafter. The other PD crystal of a type that a liquid crystal layer has a network-like polymer, structure resembling a sponge having liquid crystal particles dispersibly contained, therein, which means that the liquid crystal exists therein not in a droplet-shaped state but in a continuous state. This is hereinafter called a PNLC, and a liquid crystal panel using such a type of liquid crystal is called a PN liquid crystal panel hereinafter. An image using the PD and PN types of liquid crystal panels, by controlling a light to be scattered and transmitted.

The PD liquid crystal panel uses a property that the refractive index is different depending on the alignment direction of liquid crystal molecules. When a voltage is not applied thereto, the droplet-shaped liquid crystal molecules are aligned in irregular directions, under which, the polymer and liquid crystal are different in refractive index from each other, so that the incident light is scattered. Here, if the voltage is applied, the liquid crystal molecules are aligned in the same direction. As a result, if the refractive index of liquid crystal whose molecules are aligned in one specific direction is made equal to that of the polymer, the incident light can pass therethrough without being scattered.

Contrary to this, the PN liquid crystal uses the irregularity of the liquid crystal molecular alignment itself. Under the irregular alignment state, that is, under the application of no voltage, the incident light will be scattered. On the other hand, if a voltage is applied to make the molecular alignment regular, the light can pass therethrough. In this case, however, the explanations on the movements of liquid crystal molecules of the PD and PN liquid crystal panels are made only as one model. This invention is not limited to either a PD or PN liquid crystal panel, but the explanations will be made typically on the PD liquid crystal panel for simplification. The PD and Pn liquid crystal panels are generically called polymer dispersed liquid crystal panels. Also, the liquids containing a liquid crystal to be injected into a polymer dispersed liquid crystal panel are generically called liquid crystal solutions or resins, and the state that the resin constituent of the liquid crystal solution is polymerization-cured is called a polymer.

As a polymer matrix of a liquid crystal layer of such a polymer dispersed type of liquid crystal display device, either thermoplastic or thermosetting resin may be used basically as long as it is transparent. However, an ultraviolet curing resin is generally used in many cases because of being very simple and highly performable. This is because the production method of a conventional TN mode liquid crystal panel can be directly applied for this purpose. The production method of a convention liquid crystal panel is that a predetermined electrode pattern is formed on each of the upper and lower substrates and these tow substrates are superposed so that the electrodes thus patterned thereon confront each other. In this case, spacers each having a predetermined particle size are disposed between the two substrates, and these substrates are fixed with a sealing material of epoxy resin to hold a gap therebetween. Next, a liquid crystal is injected into the gap thus held, thus producing a liquid crystal panel.

In order to product a polymer dispersed type of liquid crystal panel applying this production method, if an ultraviolet curing resin, for example, an acrylic resin is used as polymer matrix material, is exists before injection as a comparatively low viscosity precursor such as a monomer or polymer, so that a material blended with the liquid crystal is fluid enough to be injected at room temperature. As a result, using the convention liquid crystal panel production method, a liquid crystal panel of the polymer dispersed type can be easily fabricated by irradiating light after injection to promote the curing reaction, thereby forming a polymer dispersed liquid crystal layer.

Besides, by applying ultra-violet irradiation onto the panel after injection, the polymerization reaction occurs only with the resin to become a polymer, and thus, only the liquid crystal is subjected to phase separation. If the dispersed amount of liquid crystal is smaller than the resin, droplet-shaped liquid crystal particles are formed so as to be isolated from each other. On the other hand, if the dispersed amount of liquid crystal is larger than the resin, the polymer matrix exists in the liquid crystal material in a granular or network pattern, and thus, the liquid crystal forms a continuous layer. In this case, unless the particle six of droplet-shaped liquid crystal particles or the hole size of polymer network is approximately uniform and yet ranges from 0.1 to several microns, the light has inferior scattering characteristics, so that the contrast ratio cannot be improved. In order to overcome these problems, a material that can be cured in a comparatively short period of time must be used, so that is preferable to use a resin of the ultra-violet curing type.

The operation of the polymer dispersed liquid crystal panel will be briefly explained below. When a voltage is not applied, the liquid crystal molecular direction of each liquid crystal droplet becomes irregular, under which, there occurs a difference in refractive index between the polymer and the liquid crystal, resulting in the scattering of the incident light. Here, if the voltage is applied to the electrodes, the liquid crystal molecular directions are aligned with each other. As a result, by making the refractive index of the liquid crystal when the molecules are aligned with each other in a specific direction equal to the refractive index of the polymer in advance, the incident light can be transmitted without being scattered.

As explained above, because of no need to use of polarizer, the polymer dispersed liquid crystal panel makes it possible to improve the light application efficiency as well as to obtain a displayed image with an extremely high luminance. However, the following problems occur if the above-mentions liquid crystal is intended to be used for a liquid crystal panel:

One is the delamination of the polymer dispersed liquid crystal layer and the confronted electrodes or pixel electrodes. This is due to the fact that adhesion between the electrode composed of ITO or the like and the polymer dispersed liquid crystal layer is disadvantageously low. With the liquid crystal projection type television, when a lamp as a light source is turned on, a temperature of 50° to 60° C. is applied to the liquid crystal panel, and when it is turned OFF, it becomes 10° to 30° C. in temperature. This means that the liquid panel of a liquid crystal projection television is unavoidably subjected to such a severe environmental condition that a heat shock test is carried out for every cycle of the power source being turned ON and OFF. This is one reason for delamination.

The other is an inferior scattering characteristic. In order to practically use the polymer dispersed liquid crystal panel as a device in a liquid crystal projection type television, it is required that it can be driven at a low voltage as well as having a sufficient contrast ratio. Especially, in order to obtain a good display characteristic, it is preferable that the direct view type panel have a contrast ratio of 30:1 or more, and the projection type panel have a contrast ratio of 100:1 or more.

In order to increase the contrast ratio, it is necessary to improve the scattering characteristic. Though perfect diffusion can be considered as one target of the scattering action, the contrast ratio CR in the perfect diffusion can be calculated as $$CR = 1/sin^2, \sigma$$

(Dewey, Proc. of SID, p. 138, 1977), where $\sigma$ is a converging angle (half-angle). In order to increase the contrast ratio, it is necessary to improve the scattering characteristic. The scattering characteristic can be improved by increasing the thickness of the polymer dispersed liquid crystal layer, but because the driving voltage is increased, there arises a problem in that the TFT drive becomes difficult. At present, the light scattering characteristic of the polymer dispersed liquid crystal panel has not yet been attained to the perfect diffusion-condition as an ideal scattering characteristic condition.

Especially, when used as the projection type display, the F-number of the concave mirror condensing optical system using a metal halide lamp which is now being used generally and the projection optical system matched therewith ranges from 4 to 5, so that the contrast ratio obtained when a presently known polymer dispersed liquid crystal panel is used is unsatisfactorily about 50:1.

SUMMARY OF THE INVENTION

An object of this invention is to provide a liquid crystal panel capable of realizing high luminance display and contrast, and a liquid crystal projection apparatus using the liquid crystal panel.

In order to attain the above-mentioned object, a liquid crystal panel of this invention comprises: a first substrate and second substrate which confront each other and at least one of which is transmissible to light; electrode layers respectively formed on the confronting surfaces of said first and second substrates; a polymer dispersed liquid crystal layer sandwiched between said first and second substrates, and a layer having an irregular sectional surface formed on the surface of an electrode provided on at least one of said first and second substrates.

Also, a liquid crystal projection apparatus of this invention comprises said liquid crystal panel, light emitting means, a first optical component member for guiding a light emitted from said light emitting means to said liquid crystal panel, and a second optical component member for projecting the modulated light by said liquid crystal panel.

More particularly, said layer having an irregular sectional surface is formed of a light transmissible material having a refractive index equal to or nearly equal to the refractive index $n_p$, of the polymer. The refractive index of the light transmissible material is expressed as $n_t$, the ordinary light refractive index of the liquid crystal is expressed as $n_o$, the extrorindary light refractive index of the liquid crystal is expressed as $n_e$ and $n_p = n_o$. When the liquid crystal panel is in the OFF condition, the refractive index $n_x$ of the liquid crystal layer on a total basis can be expressed macroscopically as a combined one of the refractive index $n_p$ of the polymer, and refractive indexes $n_o$ and $n_e$ of the liquid crystal. The refractive index $n_t$ of the layer having an irregular sectional surface is different from the total refractive index $n_x$ of the liquid crystal layer, so that a difference occurs in the refractive index between the layer and liquid crystal layer. If the layer having an irregular sectional surface is formed in a convex or concave pattern regularly and cyclically, the incident light to the liquid crystal panel is diffracted, and thus, the straight unscattered light component becoming small. This means that such a layer having an irregular sectional surface acts as a diffraction grating. Further this means that if the polymer dispersed liquid crystal layer is in the scattering condition, the scattering characteristic is increased on an apparent estimation basis. In addition, if it is not in the scattering condition or if the scattering performance thereof is extremely small, only the diffraction effect is used. When the liquid crystal panel is in the ON condition, the liquid crystal molecules are aligned in one specific direction, such that $n_p = n_o = n_x$. As a result, $n_p - n_t = n_x$ results. This means that there exists no difference between the refractive index $n_x$ of the liquid crystal layer and the refractive index $n_t$ of the layer having an irregular sectional surface. As a result, the diffraction grating disappears, so that the incident light goes straight through it. The larger the difference in refractive index between the liquid crystal layer and the diffraction grating becomes, the larger will be the scattering performance and diffraction efficiency.

On the other hand, even when the layer having an irregular sectional surface has convex and concave portions formed irregularly and noncyclically, for example, even when it is formed in a convex or concave form as a micro-lens, the straight going light component is reduced by the refraction effect, so that the apparent scattering performance can be improved. Besides, when the layer having an irregular sectional surface is different in dielectric constant from the polymer dispersed liquid crystal layer, the electric lines of force in the liquid crystal panel are bent, and the refractive index of the liquid crystal layer becomes temporarily large. Thus, the difference in refractive index between the liquid crystal and the polymer is made large, resulting in an increase in scattering performance.

In addition, the formation of diffraction grating means that an irregularity is formed on the confronting electrode or pixel electrode. Thus, the adhesion between the liquid crystal layer and the electrode is increased. By selecting a light transmissible materials a material forming the diffraction grating, the aperture efficiency of pixel is not reduced.

BRIEF DESCRIPTION OF THE DRAWINGS

FIG. 9 is a schematic diagram of the electric lines of force within a liquid crystal panel according to this invention.

DESCRIPTION OF THE PREFERRED EMBODIMENTS

Figure 1A:
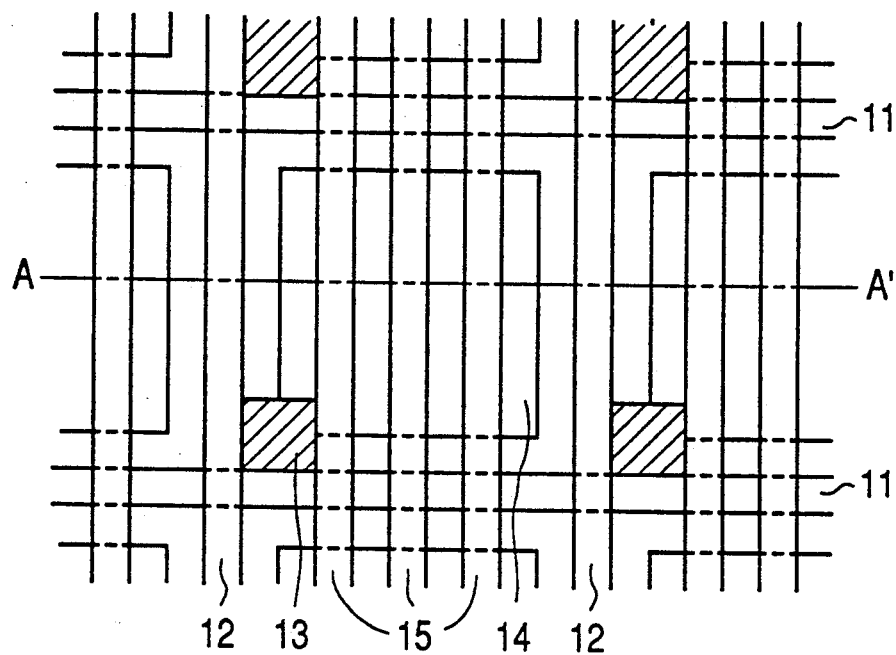
FIGS. 1(a)-1(b) are views of one pixel of a liquid crystal panel according to this invention.
Figure 1B:
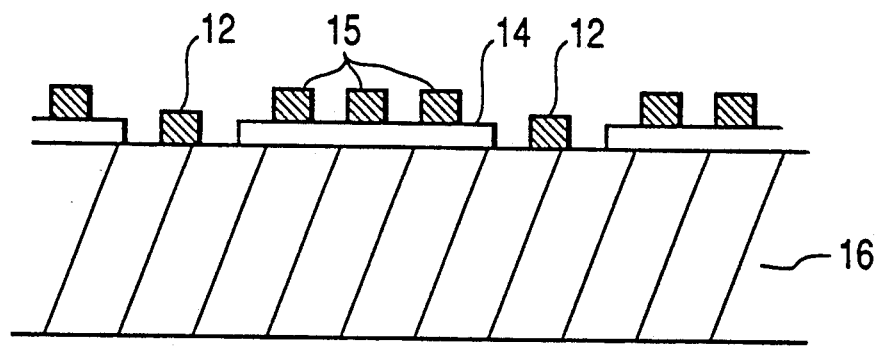
Figure 2:
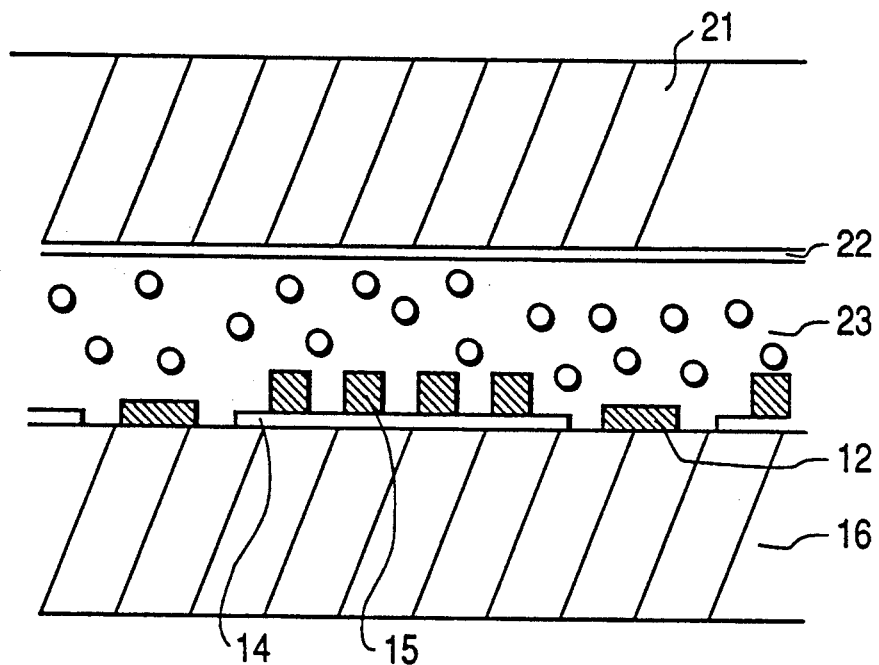
FIG. 2 is a cross-sectional view of a liquid crystal panel showing a first example of a first embodiment in accordance with this invention.

Descriptions follow on the preferred embodiments of this invention while referring to the drawings attached. FIG. 1(a) is a top view of one pixel of a liquid crystal panel of this invention, in which a confronted electrode substrate or the like is not shown for simplicity. In FIGS. 1(a) and 1(b), a layer 15 having an irregular sectional surface is formed on an array substrate 16 in a stripe form. FIG. 1(b) cross-sectionally shows the pixel taken on the line A—A' of FIG. 1(a). In addition, FIG. 2 cross-sectionally shows a liquid crystal panel which is formed by mounting a confronting substrate 21 onto the array substrate 16 of FIG. 1(a) and injecting a polymer dispersed liquid crystal 23 into a gap between the substrates 16 and 21. The layer 15 having an irregular sectional surface may be formed on the confronting substrate 21. In FIG. 2, a gate signal line 11, a source signal line 12 and a block matrix 32 for shielding a TFT 13 are not shown, but these may be formed on the confronting substrate 21. According to a first embodiment of this invention, the layer 15 having an irregular sectional surface has a surface irregularity whose convex and concave portions are formed in a regular cycle. That is, the layer 15 thus formed functions as a diffraction grating (hereinafter called a diffraction grating). In addition, FIG. 2 schematically illustrates it. For example, the number, width and shape of the diffractive grating are schematically illustrated, which means that the number, width or the like are not limited thereby. Preferably, the pixel size ranges from 30 to 200 μm and a pitch p of the diffraction grating ranges from 1 to 15 μm. As a result, the number of diffraction gratings are larger than that shown in FIGS. 1(a)-1(b) in general.

Figure 3:
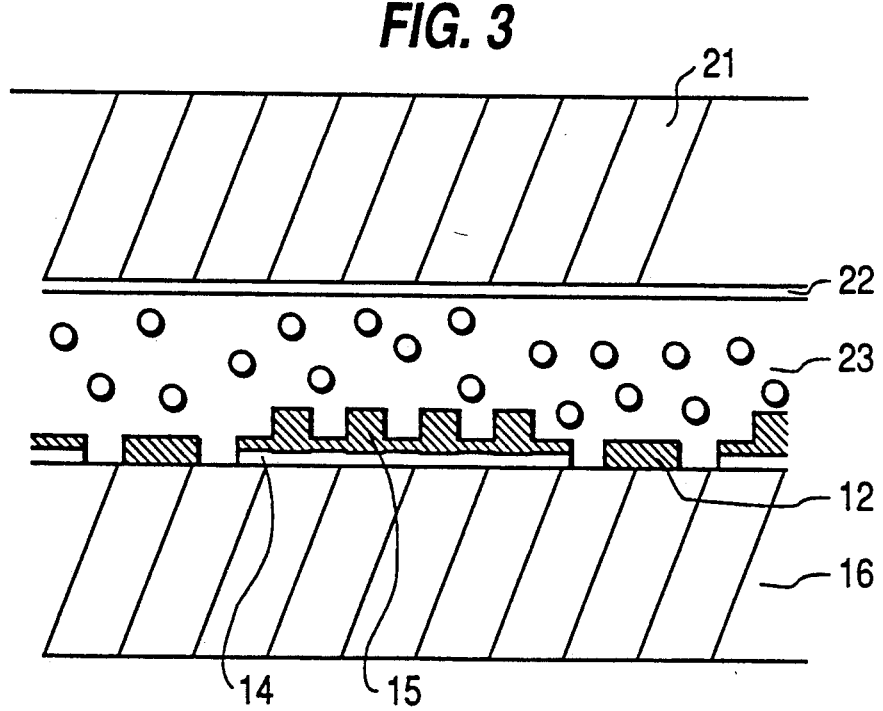
FIG. 3 is a cross-sectional view of a liquid crystal panel showing a second example of the first embodiment in accordance with this invention.
Figure 4:
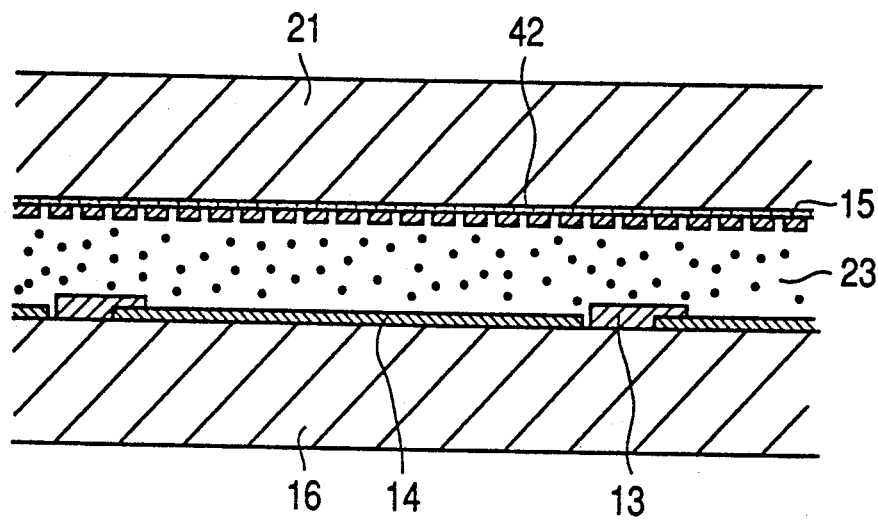
FIG. 4 is a cross-sectional view of a reflection type liquid crystal panel showing one example of this invention.
Figure 5:
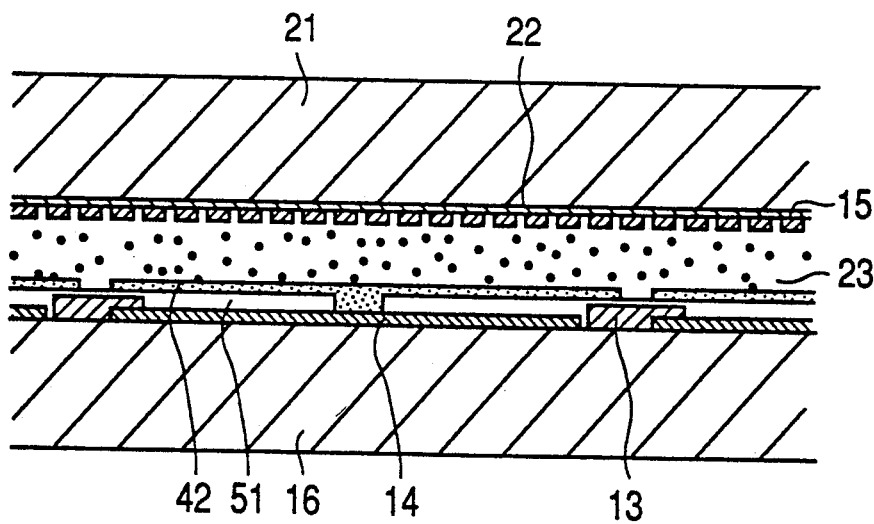
FIG. 5 is a cross-sectional view of a reflection type liquid crystal panel showing another example of this invention.

In FIGS. 1(a)-1(b) and 2, the diffraction grating 15 is formed only in a convex form, and a pixel electrode 14 is exposed at the concave portion thereof. As shown in FIG. 3, if the diffraction grating 15 is further formed at the concave portion, a voltage drop will occur at this portio, and a voltage is difficult to be applied to the liquid crystal, but the desired effects can be obtained similarly. In general, the pixel electrode 14 and the confronting electrode 22 each is formed of an indium tin oxide (ITO) which is superior in transparency. The confronting electrode 22 may be formed of a reflection electrode 42 made of a metal having a high reflectance such as Al, Cr or the like. FIG. 4 is a cross-sectional view of a reflection type liquid crystal panel. The diffraction grating 15 may be formed on the pixel electrode 14; however, it is preferable for it to be formed on the reflection electrode 42 as shown in FIG. 4. With the reflection type liquid crystal panel, an incident light is passed through the liquid crystal layer 23, then, reflected from the reflection electrode 42, and passed through the liquid crystal layer 23 and outputted. As a result, the light path becomes twice the thickness of the liquid crystal layer 23, so that if the reflection type panel has a liquid crystal layer equal in thickness to that of the transmission type panel, the former can be improved in light scattering characteristic as compared with the latter. This means that in order to obtain the same light scattering characteristic, a liquid crystal layer which is approximately one half the thickness may be satisfactorily used. The same effect can be obtained for the height d of the diffraction grating 15, that is, in case of using the reflection type liquid crystal panel, a liquid crystal layer which is approximately one half the height as compared with that of the transmission type panel can be satisfactorily used in order to obtain the same diffraction efficiently. In addition, in FIG. 4, the confronting electrode is made of a reflection electrode, but if the pixel electrode 14 is made of a reflection electrode, the same effect can be obtained. Further in addition, as shown in FIG. 5, it is further preferable to form the reflection electrode 42 through an insulting layer 51 on the upper surface of the pixel electrode 14 because the aperture efficiently can be improved.

As a material of the diffraction grating, such a material is preferably light-transmissible and optically isotropic. For this, inorganic materials such as $SiO_x$, $SiN_x$, $TaO_x$ and glass material or organic materials such as polyimide and acrylic resin materials can be used. The selection of a material to be used is determined depending on the refractive index of the polymer dispersed liquid crystal layer 23. Referring to the refractive indexes of respective materials to be frequently used, the ordinary light refractive index $n_o$ and extraordinary light refractive index $n_c$ of the liquid crystal are made ranging from 1.45 to 1.55 and ranging from 1.65 to 1.80, respectively, and the refractive index $n_p$ of the polymer ranges from 1.45 to 1.55. In addition, in many cases, $n_p = n_o$.

Referring to the dielectric constant of the diffraction grating to be used, it is preferably larger than the dielectric constant of the liquid crystal in a direction perpendicular to the alignment vector thereof and is smaller than that of the constant in a direction parallel to the alignment vector thereof. Preferably, it is made identical to the dielectric constant of the liquid crystal to be used in a direction parallel to the alignment vector thereof. As a result, sufficient electric field and electric field direction can be applied even to a liquid crystal layer on the upper of the diffraction grating.

As the liquid crystal material to be used for this invention, nematic, smectic and cholesteric materials are preferably used, which may be used singly or as a mixture containing two or more kinds of liquid crystal compounds or other materials rather than a single liquid crystal compound. A nematic liquid crystal of cyanobiphenyl system is preferably best to use in that it has the largest difference between the extraordinary light refractive index $n_c$ and ordinary light refractive index $n_o$ among the above-mentioned liquid crystal materials. As a polymer matrix material, a transparent polymer is preferably used, which can use any of thermoplastic, thermosetting and photosetting resins, but an ultra-violet curing type resin is preferably used from the viewpoint of the easiness of production process, separation from the liquid crystal phase and so on. For example, an ultra-violet curing type acrylic resin may be used, and particularly, a material that contains an acrylic monomer and acrylic oligomer which can be polymerization-cured by applying ultra-violet rays is preferably used.

As a polymer forming monomer to be used, resins such 2-ethylhexyl acrylate, 2-hydroxyethyl acrylate, neopentyl glycol acrylate, hexanediol diacrylate, diethylene glycol diaclate, tripropylene glycol diaclate, polyethylene glycol diacrylate, trimethylol propane triacylate, pentaerythritol acrylate and the like can be used.

As a oligomer or prepolymer to be used, resins such as polyester acrylate, epoxy acrylate, polurethane acrylate and the like can be used. In addition, an initiator may be used in order to perform polymerization quickly, and for this, initiators such as 2-hydroxy-2-methyl-1-phenylpropane-1-on ("Darocure 1173" produced by Merk & Corp. Inc.), 1-(4-isopropylphenyl)-2-hydroxy-2-methylpropane-1-on ("Darocure 1116" produced by Merk & Corp. Inc.), 1-hydroxycyclohexylphenylketone ("Irgacure 1864" produced by Ciba-Geigy Corp.), benzylmethylketal ("Irgacure 651" produced by Ciba-Geigy Corp.) and the like can be used.

In addition to these initiators, a chain transfer agent, photosensitizer, dye agent, crosslinking agent or the like may be appropriately applied as an arbitrary component.

After injection of a liquid-state or viscous fluid-state material having a liquid crystal uniformly dispersed into an ultra-violet curing type compound into the gap between two substrates, ultra-violet rays are applied thereto to cure only the ultra-violet curing compound, and thus, only to the liquid crystal material subjected to phase separation, thereby forming a polymer dispersed liquid crystal layer. The mixing ratio of the liquid crystal in the ultra-violet curing type compound is not specified, being in a range of from 20 to 90 weight % in general, and preferably in a range of from 50 to 70 weight %. If it is below 20 weight %, the amount of droplets of liquid crystal will become small, resulting in a lack of scattering effect. On the other hand, if it exceeds 90 weight %, the proportion of boundary surfaces will become small, resulting in a reduction in light scattering. The polymer dispersed liquid crystal layer is changed in structure with the mixing ratio of the liquid crystal, so that when it is below 50 weight %, the liquid crystal exists in the form of droplets which are isolatedly dispersed with respect to each other, and when it exceeds 50 weight %, the polymer and the liquid crystal are intricated to each other to form a continuous phase.

The refractive index $n_x$ of the liquid crystal layer 23 when the liquid crystal panel is in the OFF condition can be expressed as $(2n_o+n_c)/3$ in general. When using a liquid crystal having a positive dielectric anisotropy, the refractive index of the liquid crystal 23 becomes $n_o$ when the liquid crystal panel is in the ON condition. As a result, the diffraction grating appears when the liquid crystal panel is turned OFF, and in order to cause the diffraction grating to disappear when the panel is turned ON, the refractive index $n_t$ of the diffraction grating must be $n_t=n_o=n_p$ or, value in the vicinity of these values. That is, since the refractive index $n_x$ of the liquid crystal when it is in the OFF condition is $(2n_o+n_c)/3$, $n_t \neq n_x$ is obtained, a difference occurs in the refractive index $\Delta n$ between the diffraction grating 15 and liquid crystal layer 23. On the other hand, when the panel is in the ON condition, since the refractive index of the liquid crystal layer 15 becomes $n_o$, if $n_o=n_p$, $n_t$ becomes $n_p$, or $n_t=n_p$. Namely, no difference occurs in refractive index between the diffraction grating 15 and liquid crystal layer 23. It is preferable that the difference between the refractive index $n_t$ of the diffraction grating and the refractive index $n_p$ of the polymer is 0.1 or less, so that materials which make the difference be below 0.1 should be selected. On the other hand, in order that the diffraction grating appears when the liquid crystal panel is turned ON and disappears when the panel is turned OFF, the refractive index $n_t$ of the diffraction rating may be made identical to $(2n_o+n_c)/3$. In addition, in the case of using a liquid crystal having a negative dielectric anisotropy, when the panel is turned ON, the refractive index of the liquid crystal layer 23 becomes $n_c$, so that in order that the diffraction grating appears when the panel is in the OFF condition and disappears when the panel is in the ON condition, the refractive index $n_t$ of the diffraction grating must be equal to $n_c$ and $n_p$, or $n_t=n_c=n_p$.

From the above explanations, as a material to form the diffraction grating, it is considered that $SiO_2$ is most appropriate in that it is easy to form and fabricate on a process basis as a presently known inorganic material for this purpose. The refractive index of $SiO_2$ ranges from 1.45 to 1.50 in general. Besides, as the forming process, after evaporating $SiO_2$, it may be mask-patterned and etched. In addition, as an organic material, the same transparent polymer as is used for the liquid crystal layer 23 is best appropriate. As the forming process of the diffraction grating using the above-mentioned material, it may be coated on a substrate by using a roll coater, spinner or the like and polymerized at a necessary area only with a pattern mask. Further in addition, a photoresist resin consisting of polymer and dopant is coated on a substrate and exposed to a light through a pattern mask; then, the dopant is sublimated under the application of low pressure heating and developed dry.

The pitch p and the height d of the diffraction grating 15 are considerably varied depending on the wavelength λ of a light to be modulated, the refractive index of the liquid crystal layer 23, the directivity of a light of the optical system and the diffraction efficiently required.

Under no application of a voltage, an exit light is subjected to the effects of scattering and diffraction.

For example, as shown in FIGS. 1(a)-1(b), if the diffraction grating 15 is shaped in a rectangular cross-sectional form, the diffraction angle $\theta$, and the efficiency $\eta_o$ of the zeroth diffracted light can be expressed as follows;

$$\sin\theta = m\lambda/p \quad (m; \text{ the diffraction degree})$$

$$\eta_o = 0.5 \times (1 + \cos\delta)$$

$$(\delta = 2\pi \Delta n d/\lambda)$$

Figure 6:
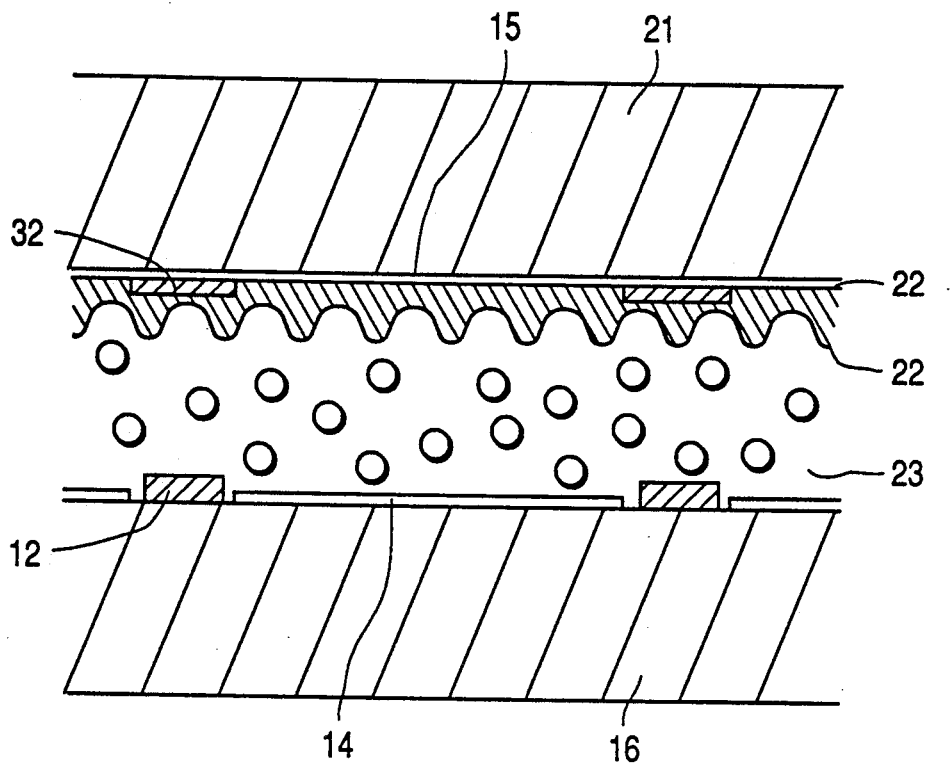
FIG. 6 is a cross-sectional view of a liquid crystal panel showing a third example of the first embodiment in accordance with this invention.
Figure 7:
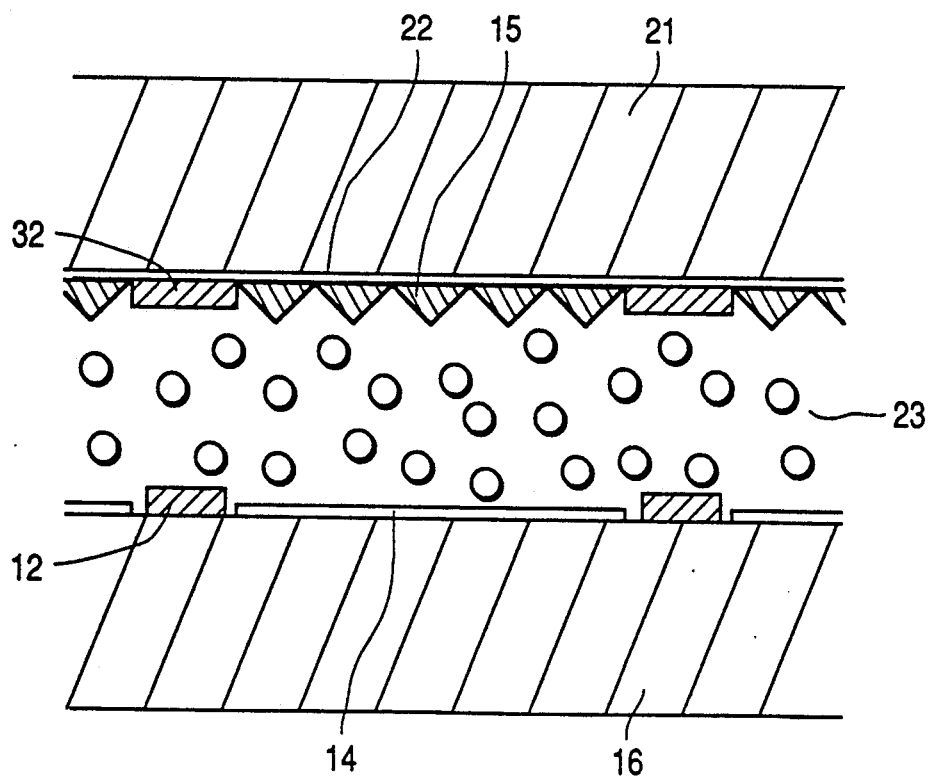
FIG. 7 is a cross-sectional view of a liquid crystal panel showing a fourth example of the first embodiment in accordance with this invention.
Figure 8:
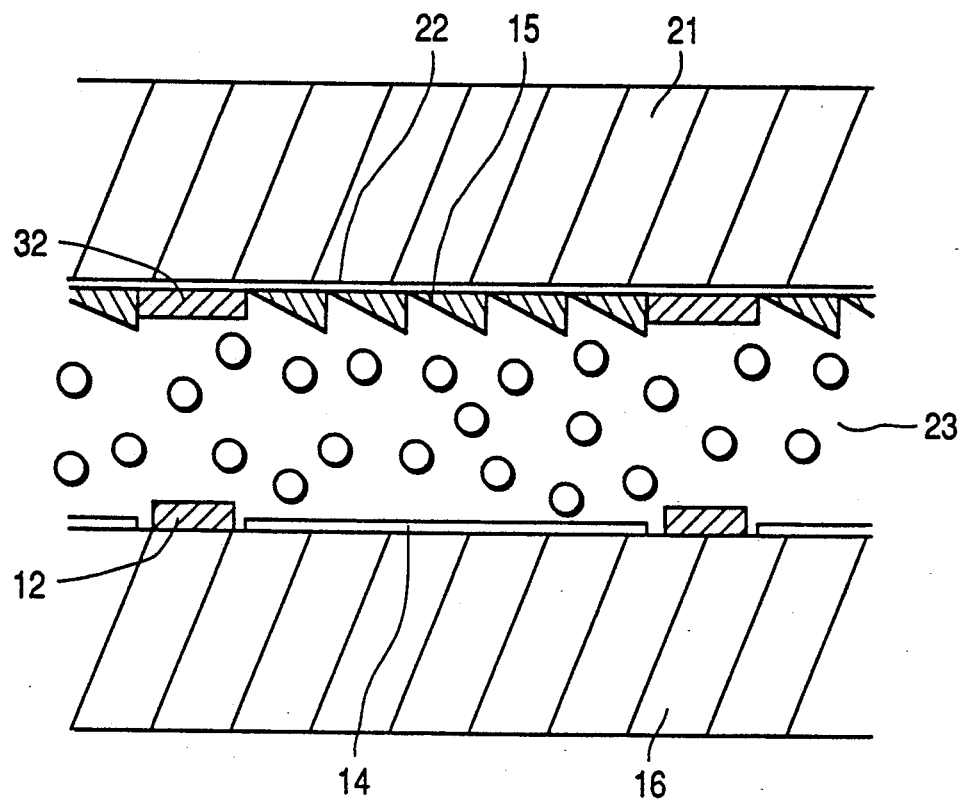
FIG. 8 is a cross-sectional view of a liquid crystal panel showing a fifth example of the first embodiment in accordance with this invention.

As a result, the pitch p and the height d of the diffraction grating to be used should be determined depending on the light directivity of the optical system, the diffraction angle $\theta$ and wavelength $\lambda$. In many cases, however, they depend largely on the process conditions of forming the diffraction grating. The pitch p approximately ranges from 2 to 60 $\mu$m, being optimum to range from 4 to 20 $\mu$m. In addition, on a process basis, the diffraction grating is frequently formed in a sine-curve form as shown in FIG. 6, in a triangular waveform as shown in FIG. 7 or a saw-tooth form as shown in FIG. 8. As a result, it may be designed to meet the desired diffraction grating and diffraction direction requirements. There arises no problem on its effect.

The height d of the diffraction grating depends largely on the diffraction efficiency. When the difference between the refractive index $n_f$ of the diffraction grating and the refractive index $n_x$ of the liquid crystal layer, or $\Delta n$ is 0.1, if the diffraction grating is rectangularly shaped in cross-section, the height d must be in the range of from 3 to 5 $\mu$m for making the zeroth light zero. However, the zeroth light is not necessarily required to be made perfectly equal to zero in general, if the diffraction efficiency is allowed to be in the range of from 40 to 70%, the height d may be in the range of from 2 to 3 $\mu$m. Even at the diffraction efficiency of 40 to 70%, the contrast obtained when it is used to make a projection type television becomes satisfactorily practically realizable.

In addition, the height d and the pitch p of the diffraction grating the limited as follows; FIG. 9 schematically shows the electric line of force in the vicinity of the diffraction grating 15. Here, the electric lines of force are started from the confronting electrode 22 and end at the pixel electrode 14 for the sake of simplifying the explanations. The electric line of force A starting from the confronting electrodes 22 between the adjacent gates of the diffraction grating 15 is extended in a direction perpendicular to the confronting electrode substrate 21, or in the normal direction thereof. However, the electric line of force B in the vicinity of the diffraction grating 15 is extended along the convex portion of the diffraction grating 15, or along the slanting surface thereof, thereby making on angle of $\theta$ with the normal direction. This is because the dielectric constant $\epsilon_x$ of the liquid crystal 23 and the dielectric constant $\epsilon_k$ of the diffraction grating 15 are largely different from each other. In general, the dielectric constant $\epsilon_s$ of the liquid crystal 23 ranges from 15 to 25, though different depending on the application of voltage and no application of voltage. On the other hand, the dielectric constant $\epsilon_k$ of the diffraction grating 15 ranges from 4 to 6. This means that the electric lines of force easily pass through the liquid crystal layer 23 and pass through the diffraction grating 15 only with difficulty.

Liquid crystal molecules are aligned along the electric lines of force when an electric field exceeding a specific level is applied. Besides, the refractive index of the liquid crystal varies depending on the alignment direction of the molecules. When the liquid crystal molecules is a parallel to the normal line of the confronting electrode substrate 21, or $\theta = 0$, the refractive index of the liquid crystal will become $n_o$ which is the ordinary light refractive index. On the other hand, when $\theta = 90$ degrees, the refractive index thereof becomes $(n_o + n_c)/2$ on a theoretical basis. When $\theta$ is between zero (0) and 90 degrees, it exhibits an intermediate value thereof. As a result, since a liquid crystal molecule 91a has an angle $\theta = 0$, the refractive index thereof will become $n_o$. A liquid crystal molecule 91b has a refractive index intermediate of $n_o$ and $(n_o + n_c)/2$.

The liquid crystal panel of this invention causes the refractive index of the liquid crystal 23 between the adjacent gates of the diffraction grating 15 to coincide with the refractive index of the diffraction grating 15 when a voltage is applied thereto, thereby eliminating the diffraction effect. When the liquid crystal molecule 91b is aligned with an angle of $\theta$, the refractive index of the liquid crystal 23 between the adjacent gates of the diffraction grating 15 does not coincide with the refractive index of the diffraction grating 15. However, when $\theta$ is small, the refractive index of the liquid crystal molecule 91b can be deemed to be substantially $n_o$. If the polymer amount does not affect the refractive index of the liquid crystal layer 23, the refractive index of liquid crystal molecules will become $n_0$ when $\theta = 0$, and $(n_o + n_c)/2$ when $\theta = 90$ degrees, but the refractive index therebetween will vary non-linearly with respect to the angle of $\theta$. Concretely, it can be deemed to vary as an approximate sine-curve. That is, when $\theta$ ranges from 0 to 20 degrees, the refractive index of liquid crystal molecule can be deemed to be $n_o$, and when it ranges from 70 to 90 degrees, it can be deemed to be $(n_o + n_c)/2$. As a result, when $\theta$ is deemed to be small, the refractive index thereof can be deemed to be $n_o$. The slant angle of the diffraction grating 15 is preferably at least 45 degrees, or $\theta = 45$ degrees, further preferably exceeding 60 degrees, or $\theta = 30$ degrees, and still further preferably exceeding 70 degrees, or $\theta = 20$ degrees.

Accordingly, the ratio d/p of the height h and pitch p of the diffraction grating preferably exceeds $\frac{1}{3}$, further preferably exceeding $\frac{1}{2}$. As a concrete design value, when the height d ranges from 3 to 4 $\mu$m, the diffraction grating is formed at the pitch p ranging from 5 to 8 $\mu$m. In this case, the diffraction angle ranges from 5 to 7 degrees, when a liquid crystal projection apparatus is structured using such a diffraction grating, such that a projection lens that has an F-number of about 4.0 can be used.

In addition, the thickness of the liquid crystal layer preferably ranges from 5 to 25 $\mu$m, and further preferably ranges from 8 to 15 $\mu$m. In this case, if the thickness exceeds 20 $\mu$m, the incident light to the liquid crystal panel is perfectly diffused to improve the scattering characteristic, but a high voltage is required for driving. On the other hand, when it does not exceed 8 $\mu$m, the panel can be driven at a low voltage, but the scattering characteristic is decreased.

Figure 10:
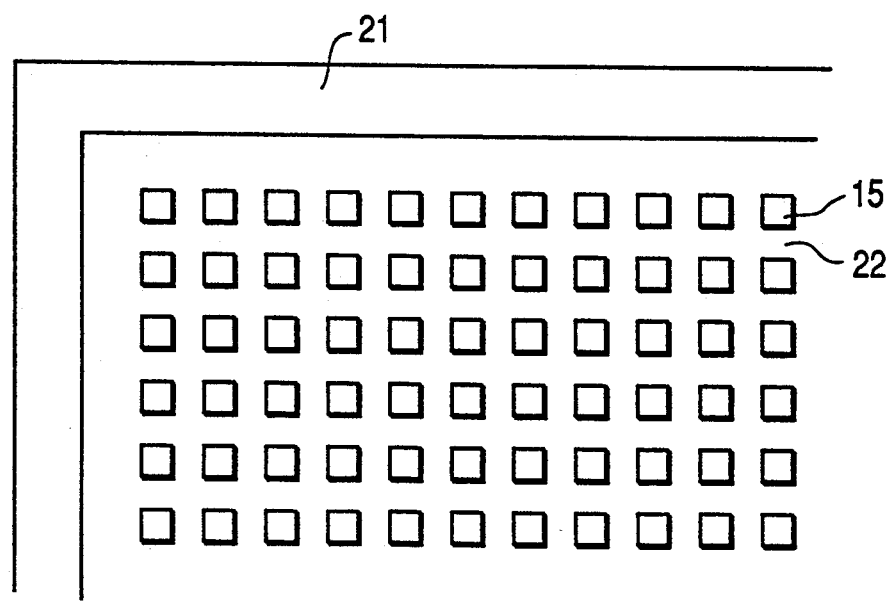
FIG. 10 is atop view of one pixel of the liquid crystal panel showing a sixth example of the first embodiment in accordance with this invention.
Figure 11:
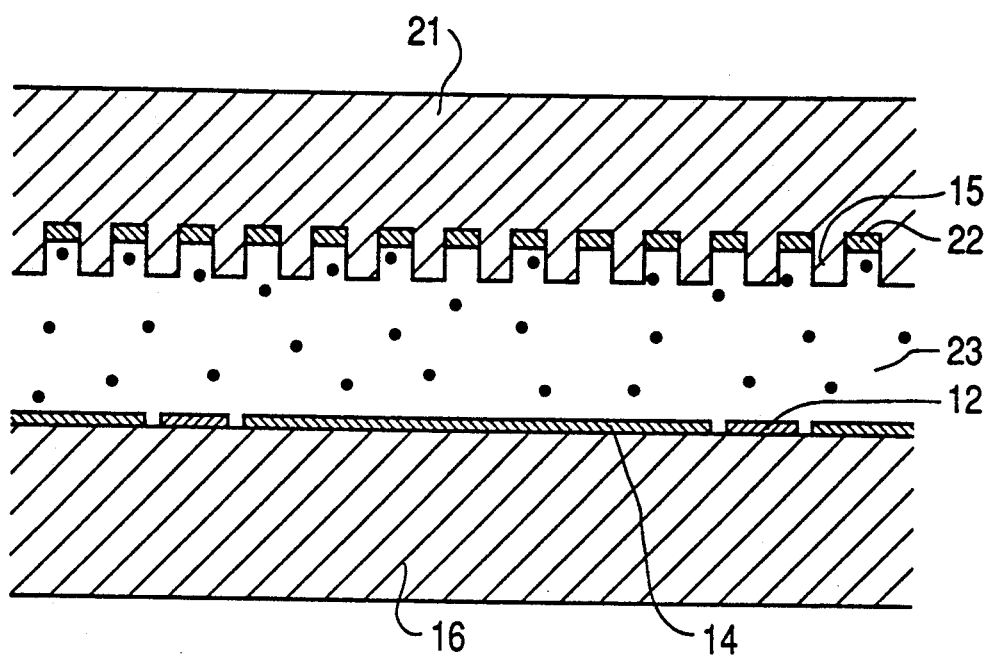
FIG. 11 is a cross-sectional view of a liquid crystal panel showing a sixth example of the first embodiment in accordance with this invention.

The diffraction grating 15 described above is formed in a stripe form; however, it may be formed in a block or columnar form in a specific spaced relationship manner on the pixel electrode 14 as shown in FIGS. 10 and 11, thereby forming a so-called two dimensional diffraction grating. FIG. 10 is a top view of one pixel of the liquid crystal panel of this invention. In the preceding explanations, since the diffraction grating 15 is formed in a stripe form, the incident light is diffracted only one-dimensionally. However, with the diffraction grating as shown FIGS. 10 and 11, the incident light can be diffracted two-dimensionally. FIG. 11 is a cross-sectional view of a liquid crystal panel which is formed by mounting a substrate as shown in FIG. 10.

Figure 12:
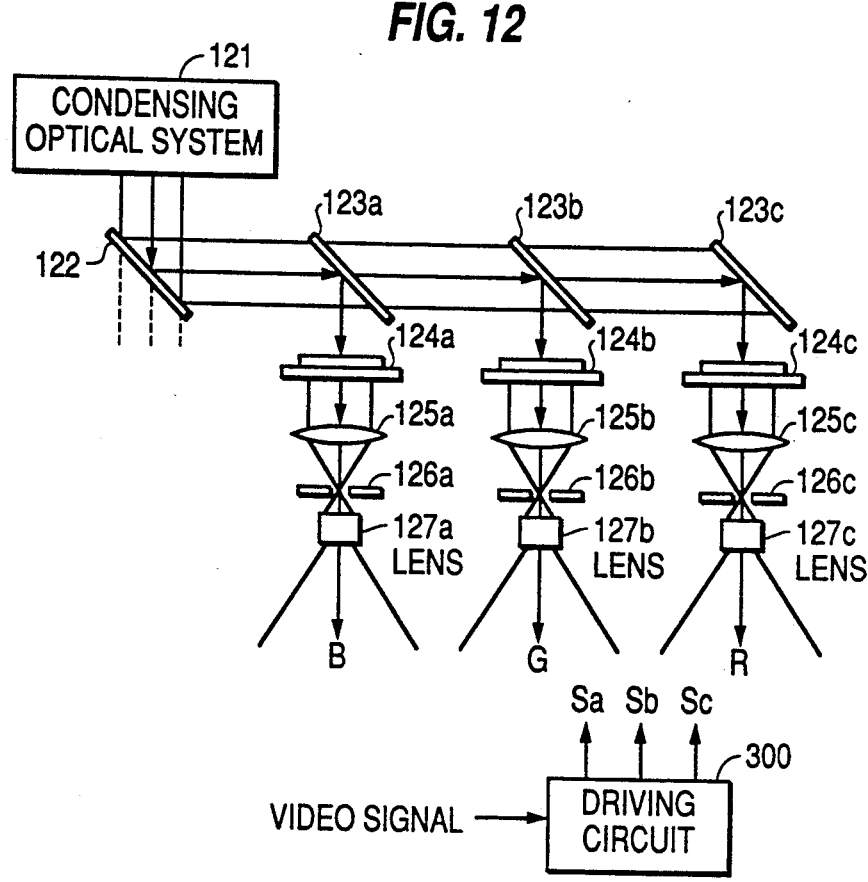
FIG. 12 is a structural diagram of a liquid crystal projection apparatus showing an example of a first embodiment in accordance with this invention.

Next, a liquid crystal projection apparatus of this invention will be explained below while referring to the attached drawings. FIG. 12 is a schematic view of a liquid crystal projection apparatus according to a first embodiment of this invention. Some component members which are unnecessary for the following explanation have been omitted. In FIG. 12, element 121 is a light condensing optical system consisting of a concave mirror and a 250W metal halide lamp used as light emitting means. The concave mirror is structured so as to reflect only the visible light. In addition, the condensing optical system 121 has an ultra-violet cut filter disposed on its exit side. In addition, element 122 is an infrared cut mirror which passes the infrared ray therethrough and reflects the visible light only. However, the infrared cut mirror 122 may be disposed in the condensing optical system 121 In addition, element 123a is a BDM; element 123b is a GDM and element 123c is an RDM. The BDM 123a, GDM 123b and RDM 123c are not limited to being arranged in this order, and a total reflection mirror may be used instead of the last RDM 123c.

Also, elements 124a, 124b and 124c are liquid crystal panels of this invention. The height d of a diffraction grating formed in the liquid crystal panel 124c for modulating an R-light is made larger in a range of 0.2 to 1.0 μm than the heights d of the other liquid crystal panels. This is because the diffraction efficiency depends on the wavelength of a light to be modulated. Also, the height d of a diffraction gating formed in the liquid crystal panel 124a for B-light modulation is made smaller in a range of 0.2 to 1.0 μm than the height d of a diffraction grating formed in the liquid crystal panel 124b for G-light modulation. The liquid crystal panel 124c for R-light modulation is formed so as to have droplet-shaped liquid crystal particles larger in particle size than the other liquid crystal panels, or so as to have a thickness which is slightly larger than those of the other panels. This is because the larger the wavelength of a light is, the more reduced is the scattering characteristic. The particle size of droplet-shaped liquid crystal particles can be controlled by controlling an ultra-violet ray for polymerization or by changing a material to be used. The thickness of the liquid crystal layer can be controlled by changing the bead size in the liquid crystal layer. Elements 125a, 125b, 125c, 127a, 127b and 127c are lenses and elements 126a, 126b and 126c are apertures used as a diaphragm, thus constituting projection lens systems, respectively. In this case, it is clear that when the projection lens system has a large F-number, an aperture 126 is not needed.

The driving circuit of the liquid crystal panel of this invention is shown in FIG. 12. A video signal is converted through the driving circuit into driving signals Sa, Sb and Sc to be used for the liquid crystal panels for R-light, G-light and B-light modulations, respectively. The driving signal Sa is applied to the gate signal line and source signal line of the liquid crystal panel 124a, the driving signal Sb is applied to the gate signal line and source signal line of the liquid crystal panel 124b, and the driving signal Sc is applied to the gate signal line and source signal line of the liquid crystal panel 124c. The successive operations can be similarly explained using the same diagram, and the explanations thereof have been omitted here.

Next, the operation of the liquid crystal projection apparatus of this invention will be explained below. The modulation systems of R-, G- and B-lights respectively operate in the same manner, so that the B-light modulation system will be typically explained below. First, a white light is irradiated from the condensing optical system 121, and the B-light component of the white light thus irradiated is reflected by the BDM 123a. The B-light thus reflected is incident to the polymer dispersed liquid crystal panel 124a. The scattered light is stopped by the aperture 126a, and on the other hand, the parallel light or the light within a predetermined angle range is passed through the aperture 126a. The modulated light is extensibly projected by the projection lens 127a on a projection screen (not shown). Accordingly, the B-light component of a picture can be uniformly displayed in the screen.

Similarly, the polymer dispersed liquid crystal panel 124b modulates the G-light component of the white light, and the polymer dispersed liquid crystal panel 124c modulates the R-light component of the white light, thus displaying a color picture on the screen.

The projection lens system or the like is arranged as follows: First, the distance L between the polymer dispersed liquid crystal panel 124 and the lens 125 of the apparatus is made substantially equal to the distance between the lens 125 and the aperture 126. The thus arranged projection lens system serves to pass the parallel light which has passed through respective liquid crystal panels and to stop the scattered light by respective liquid crystal panels. As a result, a full-color display with a high contrast can be realized on the screen. By decreasing the opening diameter D of the aperture, the contrast can be improved. However, the picture luminance on the screen is reduced. The apparatus shown in FIG. 12 can be considered to be a simple Schlieren optical system.

Figure 13:
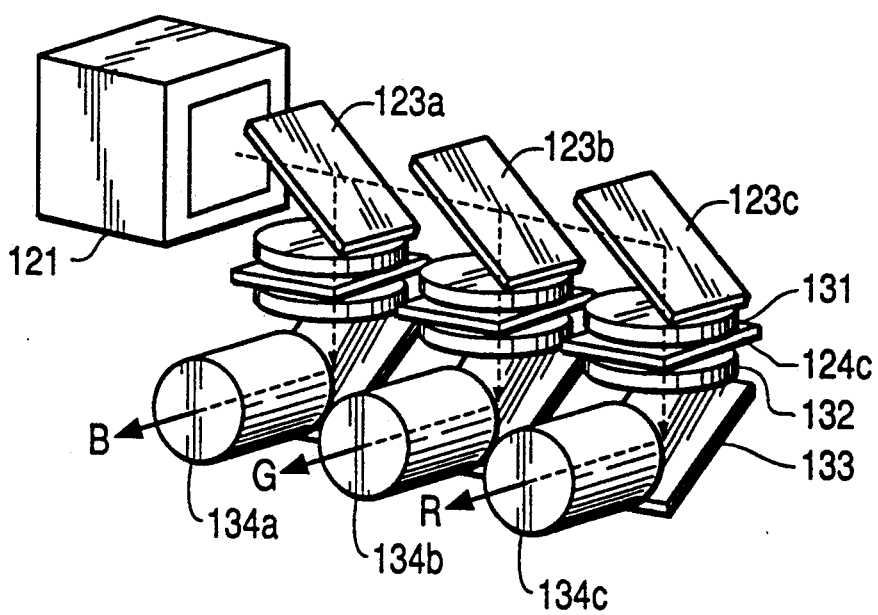
FIG. 13 is a structural diagram of a liquid crystal projection apparatus showing another example of the first embodiment in accordance with this invention.

With the liquid crystal panel of this invention, when the thickness of the liquid crystal layer ranges from 10 to 15 μm, the converging angle θ of the lens is required not to exceed 8 degrees on a total angle basis. Particularly, it is optimum to be about 6 degrees, and at this time, the contrast is 100:1 at the central area of screen surface, and when projected on a 40-inch screen with a rear projection television, it exceeds 200 foot-Lambert at a screen gain of 5, so that a picture luminance equivalent to or more than that of a CRT projection television could be obtained. As a lamp, a short arc-length one is used. More concretely, the structured diagram of FIG. 12 is shown, for example, by a perspective view as shown in FIG. 13. In FIG. 13, element 121 is a light condensing optical system; element 123 is a dichroic mirror; element 124 is a liquid crystal panel of this invention; elements 131 and 132 are lenses; element 133 is a mirror; and elements 134a, 134b and 134c are projection lenses or projection lens systems each having an aperture.

In the liquid crystal panel of this invention, an incident light is scattered and at the same time, diffracted and outputted. In this case, however, when the diffraction grating 15 is formed in a stripe form as shown in FIGS. 1 to 9, the intensity distribution of a light of a wave surface in the direction parallel to the diffraction grating 15 is not diffracted at all, thus being subjected to only the effect of scattering. As a result, there occurs a difference in effect of scattering (diffraction) depending on the vibrative direction of light. Accordingly, an anamorphic lens is disposed before a light and is incident to the panel to give a difference to the extension angle of a light in advance and then, the light is incident to the panel, so that the anisotropy of scattering characteristic can be corrected. Or, the correction thereof can be made by matching the aperture efficiencies of the apertures 126a, 126b and 126c with the differences in scattering characteristic of respective panels and opening them in different shapes depending on their directions.

Figure 14:
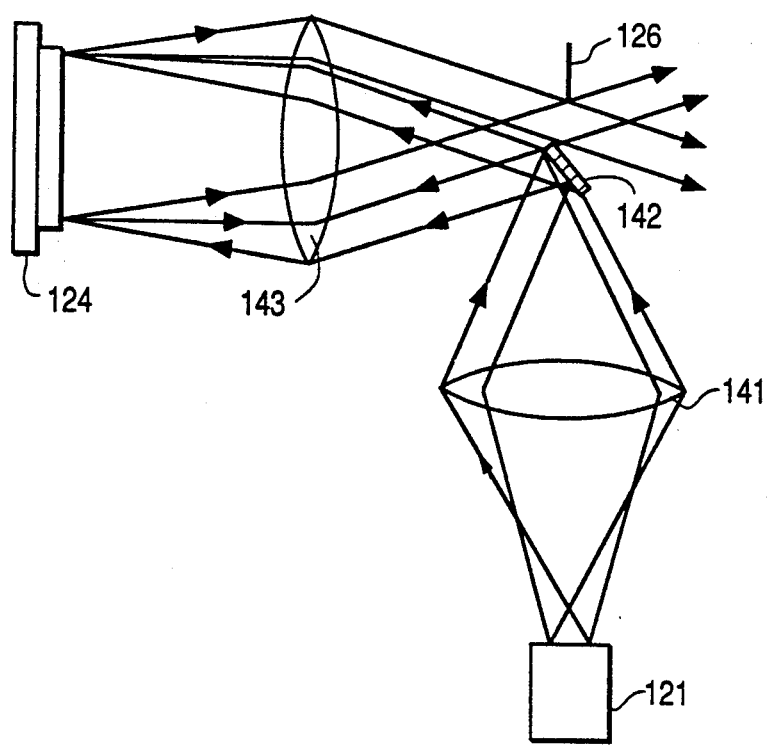
FIG. 14 is a structural diagram of a liquid crystal projection apparatus showing further another example of the first embodiment in accordance with this invention.

The optical system can be structured in a reflection type as shown in FIG. 14 other than that shown in FIG. 12. In FIG. 14, element 124 is a liquid crystal panel of this invention. A light emitted from a light emitting source 121 such as xenon lamp is condensed through a lens 141 onto a mirror 142. The thus condensed light is incident to a lens 143 and sent to the liquid crystal panel 124. The liquid crystal panel 124 modulates the thus sent light, and scatters the light at an area for black display and reflects the light directly at an area for white display. The thus scattered or reflected light is incident again to the lens 143. The scattered light is stopped by the mirror 142 and a light stopping plate 126. The straight going light is passed through the space between the mirror 142 and the light stopping plate 126 to be projected on a screen (not shown) to display a picture thereon. In FIG. 14, component members which are unnecessary for the explanation have been omitted as in the case of FIG. 12. As a result, when it is arranged practically, a field lens and a projection lens which is matched to the projection distance and projection angle should be arranged.

Besides, the projection systems shown in FIGS. 12 and 14 are not limited thereto, and for example, a center shield type optical system can be used in which the parallel light component is stopped by a light stopping body and the scattered light is projected on a screen.

In addition, the structure of a liquid crystal panel of this invention is not limited to the TFT structure, and it can be effectively applied to a liquid crystal display apparatus using a two-terminal element such as the diode and the like as a switching element.

Further in addition, a light is incident from the confronting substrate side to the liquid crystal panel in FIG. 12 or 14, but is not limited thereto, and it can be clearly understood that when it is incident from the array substrate side thereto, the same effect can be obtained. As explained above, the liquid crystal panel and the liquid crystal projection apparatus using the panel of this invention are independent of the direction that the incident light.

Also, in the first embodiment of this invention, the liquid crystal projection apparatus of this invention is explained to be a rear projection type liquid crystal television, but is not limited thereto, so that a front projection type liquid crystal television in which a picture is projected on a reflection type screen may be used. In addition, in the liquid crystal projection apparatus in the first embodiment, color separation is achieved by using a dichroic mirror, but it is not limited thereto, so that it can be achieved by using, for example, an absorption type color filter.

Further in addition, in the liquid crystal projection apparatus of this embodiment, the R-, G-, and B-light modulation systems each has a projection lens system, but it is not limited thereto, and it can be structured so that the displayed pictures modulated by respective liquid crystal panels are collected into one picture using a mirror or the like, and then, sent to one projection lens system and projected. Still further in addition, the liquid crystal panels respectively modulating R-, G-, and B-lights are disposed in the apparatus of this embodiment, but are not limited thereto, so that, for example, a single panel type projection apparatus may be used such that color filters are mounted on one liquid crystal panel in a mosaic pattern so as to thereby project a pixel of the panel.

Next, a liquid crystal panel and a liquid crystal projection apparatus using the panel according to a second embodiment of this invention will be described below, in which the descriptions will be made on only the difference from the first embodiment. This means that the same component members as those in the first embodiment have not been described here. The description of only the difference in the embodiment will also be made in the successively described embodiments. In this embodiment, the scattering of a polymer dispersed liquid crystal layer is made as small as possible, mainly using the diffraction effect.

In order to minimize the scattering of the polymer dispersed liquid crystal layer, the thickness d of the liquid crystal layer must be made small; the average particle size of droplet-shaped liquid crystal particles held by the polymer or the average void space r of the polymer must be made small, or the mixing ratio of the liquid crystal material of the polymer dispersed liquid crystal layer must be made large. Preferably, d is 5 $\mu$m or less, r is 1 $\mu$m or less, and the mixing ratio thereof exceeds 90 weight In this case, it is good if at least one of these conditions is satisfied. If the scattering is high, the diffraction effect will be eased. The particle size of the droplet-shaped liquid crystal particles can be controlled by controlling the ultraviolet rays for polymerization or by varying the liquid crystal material to be used. The thickness of the liquid crystal layer can be adjusted by varying the bead size int he liquid crystal layer. If the thickness is made small, the liquid crystal panel can be driven with a low voltage.

Figure 15:
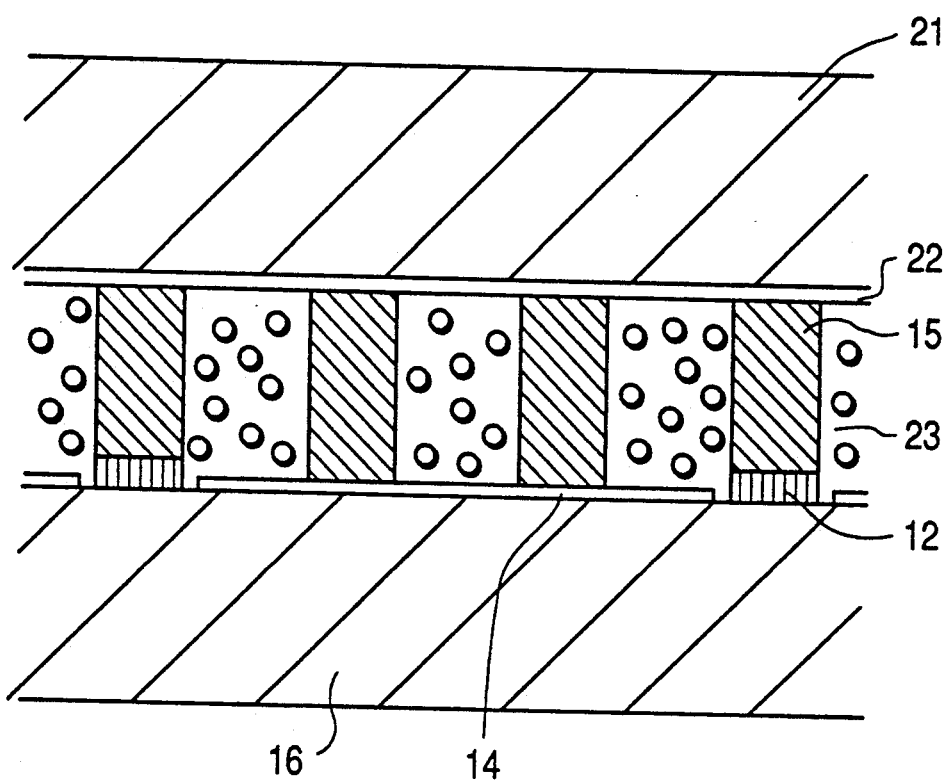
FIG. 15 is a cross-sectional view of a liquid crystal panel showing an example of a second embodiment in accordance with this invention.

As a result, the liquid crystal panel of this embodiment may be considered to be approximately identical in structure to that of the first embodiment. In this case, however, the liquid crystal layer 23 satisfies at least one of the three conditions shown above. The diffraction efficiency can be varied by changing the refractive index of the liquid crystal layer by applying an electric field between the pixel electrode 14 and confronting electrode 22. This is the same as was already explained with respect to the first embodiment. When the liquid crystal layer is thin, it is possibly shown cross-sectionally as shown in FIG. 15. In FIG. 15, the height of the diffraction grating 15 is substantially identical to the height of the liquid crystal layer 23. In addition, the other component members are similar to those of the first embodiment.

According to this invention, even if the material making the diffraction grating 15 is low in dielectric constant, the confronting electrode 22 and pixel electrode 14 may be disposed under the grating 15. This is because there is no liquid crystal layer 23 at the portion of the diffraction grating 15, being unnecessary to drive. Besides, in the first embodiment, the diffraction grating is disposed on the electrode, so that a voltage drop will occur and the direction of the electric lines of force within the liquid crystal layer 23 will become extremely complex. However, by forming the liquid crystal layer only in the concave portion of the diffraction grating as in this invention, such problems do not occur, so that in the OFF condition, the difference in refractive index appears between the diffraction grating 15 and liquid crystal layer 23, and, on the other hand, in the ON condition, such a difference disappears, so that the diffraction effect is eliminated, thus being possible to be displayed.

The applications of this liquid crystal panel to other structures explained in the first embodiment can be wholly applied to the second embodiment.

Figure 16:
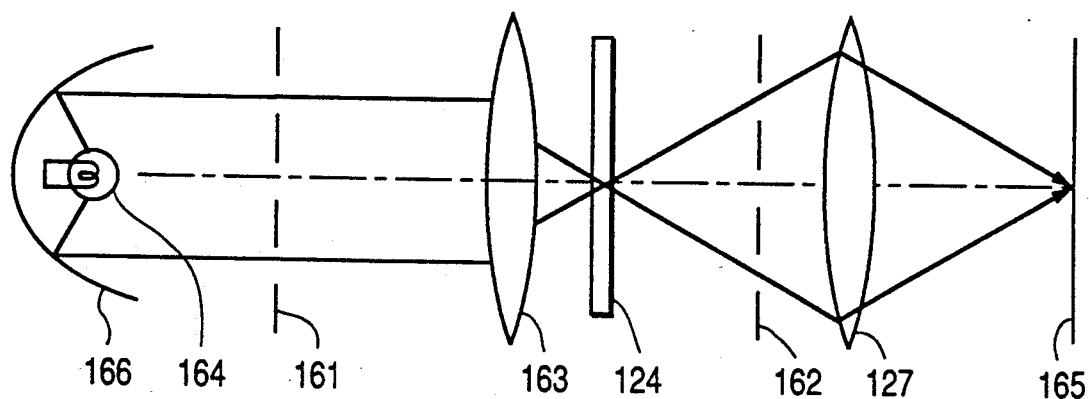
FIG. 16 is a theoretical structural diagram of a liquid crystal projection apparatus of a second embodiment in accordance with this invention.

A liquid crystal projection apparatus of the second embodiment will be explained below by referring to the drawings attached. FIG. 16 is a schematic diagram showing the theoretical structure of the liquid crystal projection apparatus of this invention, in which a Schlieren optical system is employed. In FIG. 16, a liquid crystal panel 124 is used as a light valve, a Schlieren lens 163 is disposed between a Schlieren input mask 161 having a large number of apertures and an output mask 162 so as to thereby develop an image of the input mask 161 on the output mask 162, thus forming the Schlieren optical system. The liquid crystal panel 124 is disposed in the Schlieren optical system. In this embodiment, the Schlieren lens 163 is disposed between the input mask 161 and the liquid crystal panel 124, but it may be disposed between the liquid crystal panel 124 and the output mask 162. A concave mirror 166 is used for increasing the application light efficiency, but it may be omitted. A light from a light source 164 is incident through the input mask 16 and Schlieren lens 163 in the Schlieren optical system to the liquid crystal panel 124, so that an image is projected through a projection lens 127 on a screen 165 as light leaks from the aperture pattern of the output mask 162 due to the diffraction of a light in response to the projected image in the liquid crystal panel 124.

Figure 17:
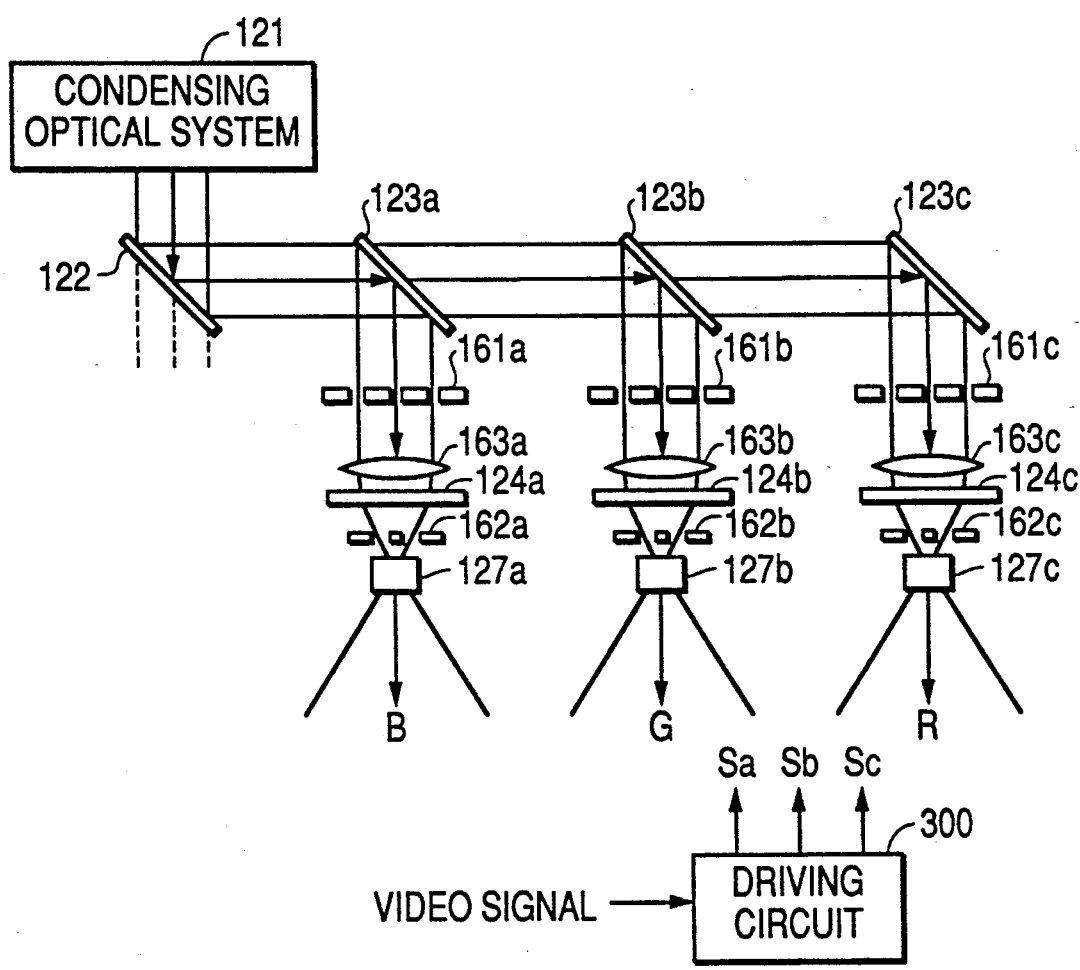
FIG. 17 is a structural diagram of a liquid crystal projection apparatus showing one example of the second embodiment in accordance with this invention.

FIG. 17 schematically shows a liquid crystal projection apparatus of this embodiment. In FIG. 17, 121 is a light condensing optical system having a concave mirror and a 250W metal halide lamp used as a light emitting means. The concave mirror is formed so as to reflect only the visible light. The condensing optical system 121 has an ultra-violet cut filter disposed on its exit end, and element 122 is an infrared cut mirror which passes the infrared rays therethrough and reflects only the visible light therefrom. In this case, however, the infrared cut mirror 122 may be disposed in the condensing optical system 121. In addition, element 123a is BDM; element 123b is GDM, and element 123c is RDM, and these dichroic mirrors 123a, 123b and 123c are not limited to be disposed in this order, and the last RDM 123c may be replaced by a total reflection mirror.

Also, elements 124a, 124b and 124c are liquid crystal panels of this invention. Out of these panels, the liquid crystal panel 124c for R-light modulation has a diffraction grating whose height is larger in a range of 0.1 to 0.2 μm than the heights d of the other panels 124a and 124b. This is because the diffraction efficiency depends on the wavelength of a light to be modulated. In addition, the height of the diffraction grating of the liquid crystal panel 124a for B-light modulation is made smaller in a range of 0.1 to 0.2 μm than that of the panel 124b for G-light modulation according to the necessity. Also, elements 161a, 161b and 161c are input masks; elements 162a, 162b and 162c are output masks, and elements 163a, 163b and 163c are Schlieren lenses. The input mask 161, output mask 162 and Schlieren lens 163 makes a Schlieren optical system, and elements 127a, 127b and 127c are projection lenses.

With the liquid crystal panel of this invention, when the thickness of the liquid crystal layer ranges from 3 to 6 μm, and the pitch and height of the diffraction grating are 4 to 5 μm and 3 to 6 μm, respectively, the converging angle θ of the lens must not exceed 8 degrees on a total angle basis. The optimum value of θ is about 6 degrees, and at this time, the contrast ratio at the central area of picture surface is 100:1, and when projected on a 40-inch screen with a rear type liquid crystal projection apparatus, such a picture quality that is compatible to that obtained with the CRT projection apparatus can be obtained. As the lamp, a metal halide lamp of short arc-length was used; a xenon lamp may be used instead.

The operation of the liquid crystal projection apparatus of this embodiment will be explained below. In these explanations, the operation of the B-light modulation system will be typically exemplified because the R-, G- and B-light modulation systems are all operated in a substantially similar manner. First, a white light is irradiated from the condensing optical system 121 and the B-light component of the white light thus irradiated is reflected by the BDM 123a. The B-light thus reflected is incident through the input mask 161a and Schlieren lens 163a to the polymer dispersed liquid crystal panel 124a. The polymer dispersed liquid crystal panel 124a controls through the diffraction grating the refractive index of the liquid crystal layer by using a signal applied to the pixel electrode, and thus, the incident light is modulated. If there exists no difference in refractive index between the liquid crystal layer and diffraction grating, the light goes straight and is stopped by the output mask 162a, and on the other hand, if there exists a difference in refractive index therebetween, the incident light is diffracted and passed through the output mask 162a. The modulated light is extensibly projected through the projection lens 127a on a projection screen (not shown). As a result, the B-light component of the image is displayed on the screen. Similarly, the polymer dispersed liquid crystal panel 124b modulates the G-light component and the polymer dispersed liquid crystal panel 124c modulates the R-light component, and thus, a color picture is displayed on the screen.

Figure 19:
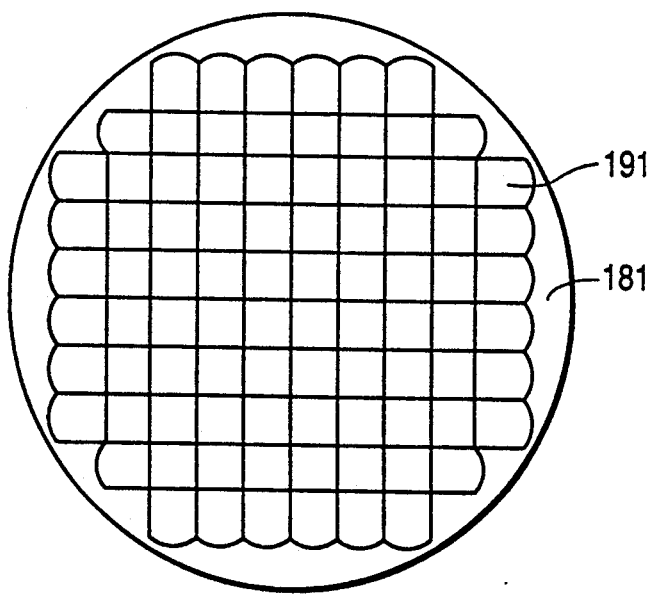
FIG. 19 is a top view of a fly-eye lens.
Figure 18:
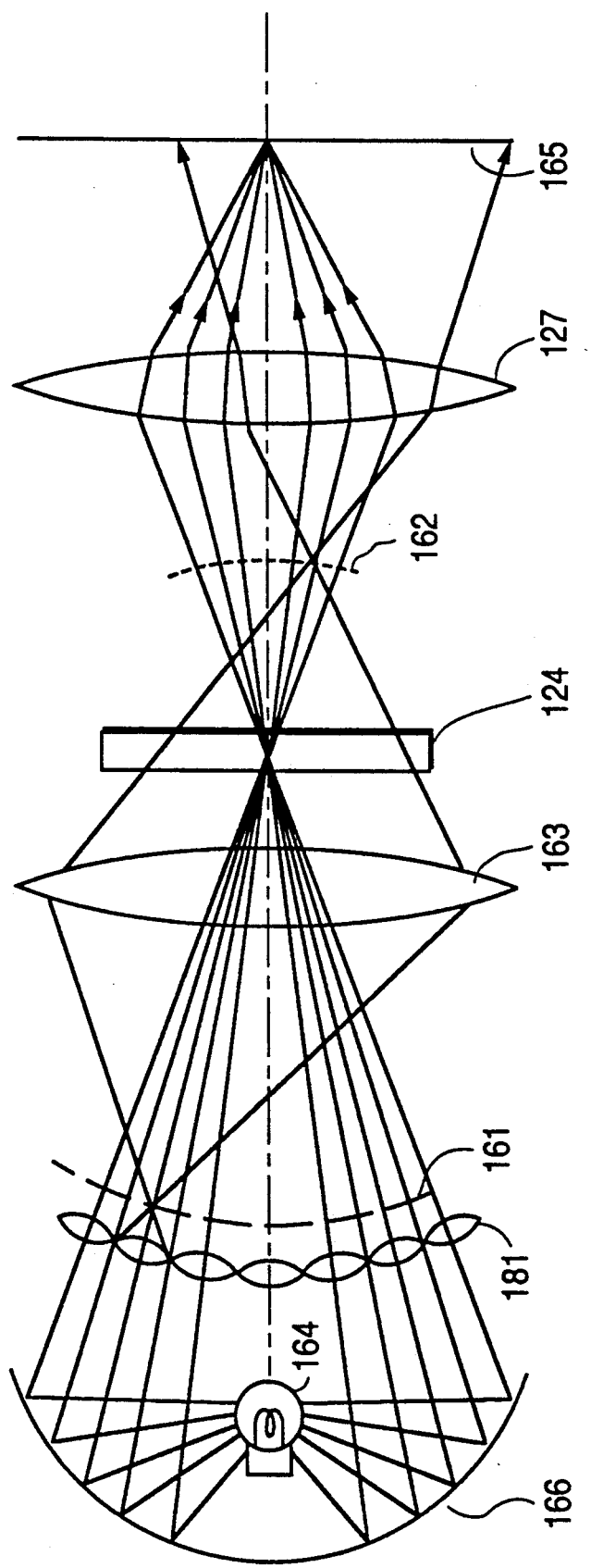
FIG. 18 is a theoretical structural diagram of a liquid crystal projection apparatus showing another example of the second embodiment in accordance with this invention.

FIG. 18 shows the liquid crystal projection apparatus of the second embodiment of this invention. A fly-eye lens 181 is disposed between the light source 164 and the input mask 161. The fly-eye lens 181 is designed and disposed so that a light source image is formed through the fly-eye lens 181 at the aperture portion of the input mask 161, thus serving to form a micro-lens array. It is preferable to dispose a field lens array (not shown) at the vicinity of the input mask 161. The other structure is the same as that shown in FIG. 16. The liquid crystal panel 124 as a light valve is the polymer dispersed liquid crystal panel having a diffraction grating used in the apparatus shown in FIG. 16. FIG. 19 is a top view of the fly-eye lens 181. The fly-eye lens 181 is a collection of micro-lens arrays and is structured so as to match each of micro-lenses 191 to the corresponding one of the apertures of the input mask 161. As a result, light emitted from the light source 164 and passed through one micro-lens 191 is passed through the corresponding aperture of the input mask 161, and then passed through the Schlieren lens 163, liquid crystal panel 124 and output mask 162 and projected through the projection lens 127 on the projection screen 165. If this light path is considered as one optical system, the F-number can be made large and the contrast can be made high and at the same time, the optical system of this apparatus can be deemed as one system formed by collecting a large number of such optical systems, resulting in no reduction in brightness. This means that when the liquid crystal panel 124 is under the transmission condition, the whole surface of pupil is utilized, and when it is under the diffraction condition, the pupil area thereof is effectively decreased by the output mask 162.

Figure 20:
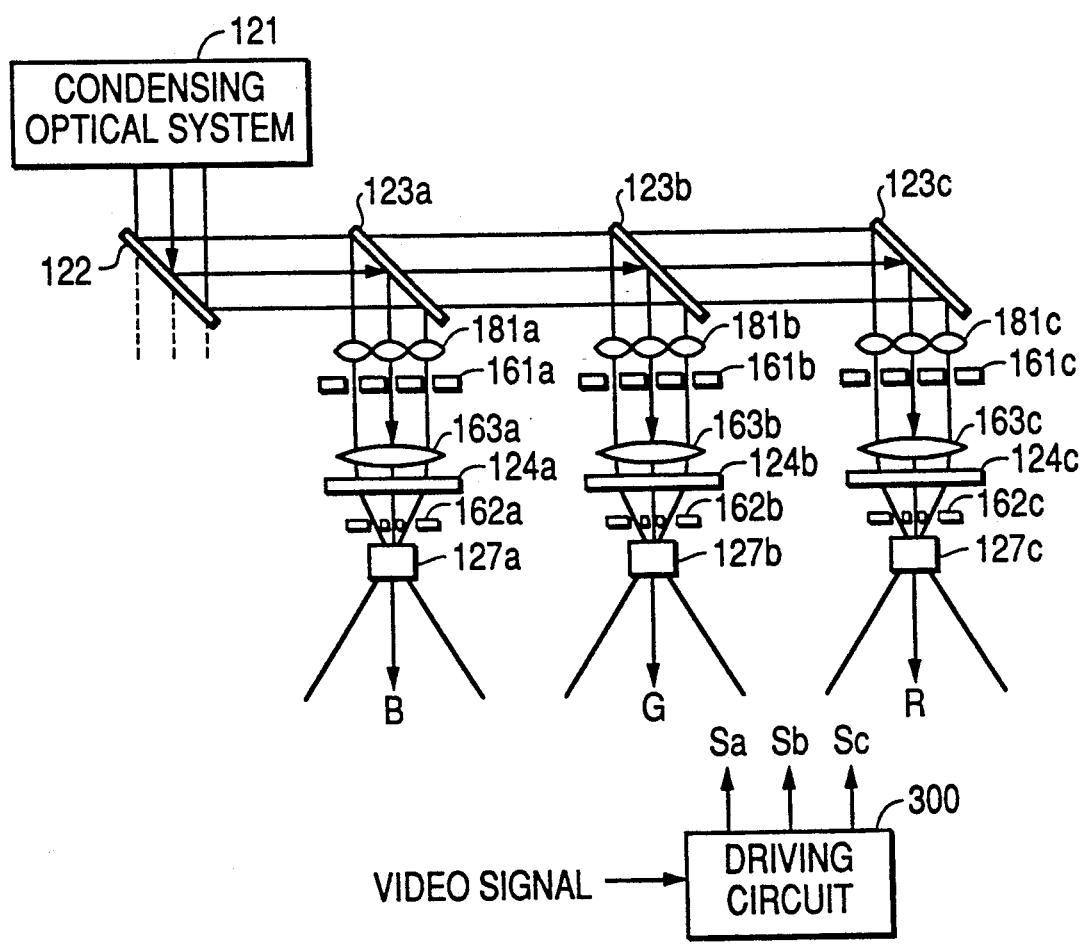
FIG. 20 is a structural diagram of a liquid crystal projection apparatus showing another example of the second embodiment in accordance with this invention.

The operation of the liquid crystal projection apparatus shown in FIG. 18 will be explained below by referring to FIG. 20 which shows the structure thereof, and in which the component members which are unnecessary for explaining the operation of the system have been omitted. In FIG. 20, element 121 is a light condensing optical system having a concave mirror and a 250W metal halide lamp used as light emitting means. The concave mirror is structured so as to reflect only the visible light. The condensing optical system 121 has an ultra-violet cut filter disposed on its exit end. In addition, element 122 is an infrared cut filter which passes the infrared rays therethrough and reflects only the visible light therefrom. However, the infrared cut filter 122 ma be disposed in the condensing optical system 121. Also, element 123a is a BDM; element 123b is a GDM and element 123c is a RDM, the arrangement of which is not limited to this order, and the last RDM 123c may be replaced by a total reflection mirror.

Further in addition, elements 124a, 124b and 124c are liquid crystal panels of this invention. Out of which, the liquid crystal panel 124c for R-light modulation has the diffraction grating whose height d is formed larger in a range of 0.2 to 1.0 μm than the heights d of the other panels 124a and 124b. This is because the diffraction efficiency depends on the wavelength of a light to be modulated. Also, the height of the diffraction grating of the liquid crystal panel 124a for B-light modulation is made smaller in a range of 0.2 to 1.0 μm than that of the liquid crystal panel 124b for G-light modulation. Also, elements 161a, 161b and 161c are input masks; elements 162a, 162b and 162c are output masks, and elements 163a, 163b and 163c are Schlieren lenses. In addition, element 181a, 181b and 181c are fly-eye lenses, and element 127a, 127b and 127c are projection lenses. The fly-eye lens 181 and input mask 161 may be collected in one body and disposed between the converging optical system 121 and the dichroic mirror 123a. The Schlieren lens 163 may be disposed between the liquid crystal panel 124 and output mask 162.

With the liquid crystal projection apparatus of this embodiment, if the thickness of the liquid crystal layer ranges from 10 to 15 μm, even when the converging angle θ of the projection lens is about 6 degrees on a total angle basis, the contrast ratio could exceed 100:1 at the central area of the picture surface, and when projected on a 40-inch screen with rear projection television, the picture quality could be obtained which is comparable to that obtained by a CRT projection television. The lamp to be used is a 250W metal halide lamp with an arc-length of 7 mm, and the characteristic could be satisfactorily obtained despite the act that a short arc-length lamp was not used.

Next, the operation of the liquid crystal projection apparatus of this embodiment will be explained below. In the explanations, the B-light modulation system is typically exemplified because the R-, G- and B-light modulation systems are substantially similar in operation. First, a white light is irradiated from the condensing optical system 121, and the B-light component of the white light is reflected by the BDM 123a. The B-light thus reflected is incident through the fly-eye lens 181a, input mask 161a and Schlieren lens 163a to the liquid crystal panel 124a. The liquid crystal panel 124a controls and modulates the diffraction of the incident light by using a signal applied to the pixel electrode. The diffracted light is stopped by the output mask 162a and on the other hand, the parallel light or the light in a predetermined angle range is passed through the output mask 162a. The modulated light is extensibly projected through the projection lens 127a on a screen (not shown). Thus, the B-light component of an image is displayed on the screen. Similarly, the polymer dispersed liquid crystal panel 124b modulates the G-light component of the white light, and the polymer dispersed liquid crystal panel 124c modulates the R-light component thereof, and thus, a color picture is displayed on the screen.

Figure 21A:
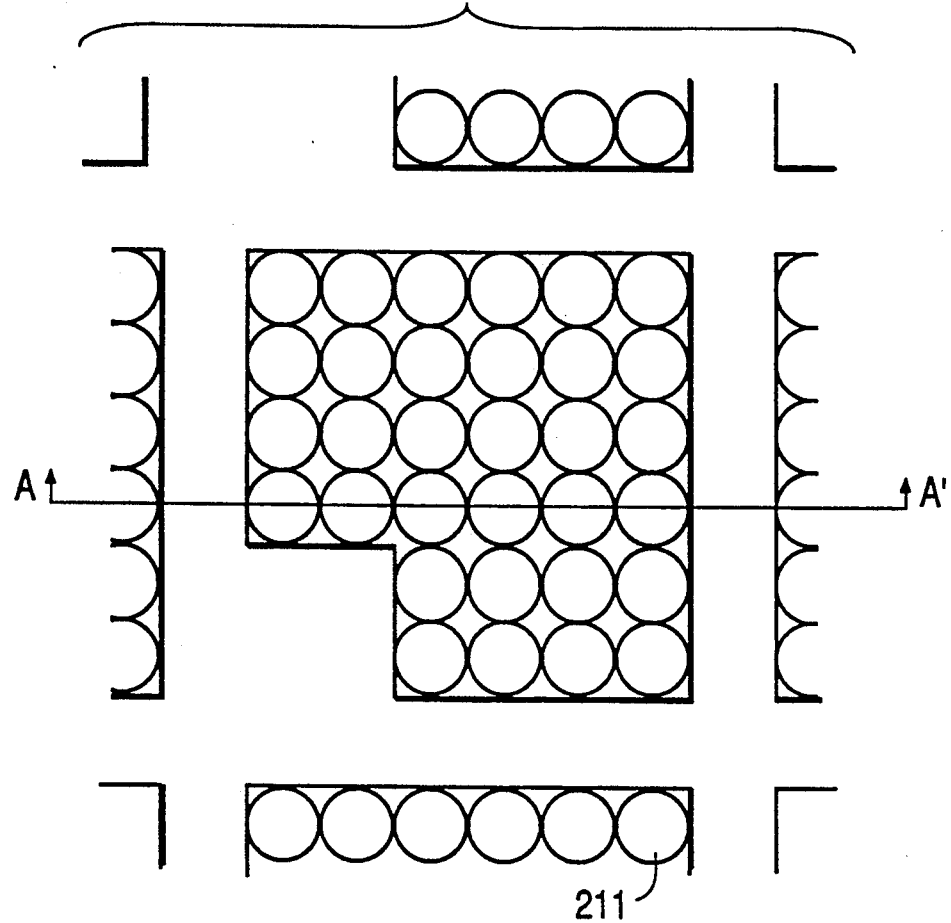
FIGS. 21(a)-21(b) are views of one pixel of a liquid crystal panel showing one example of a third embodiment in accordance with this invention.
Figure 21B:
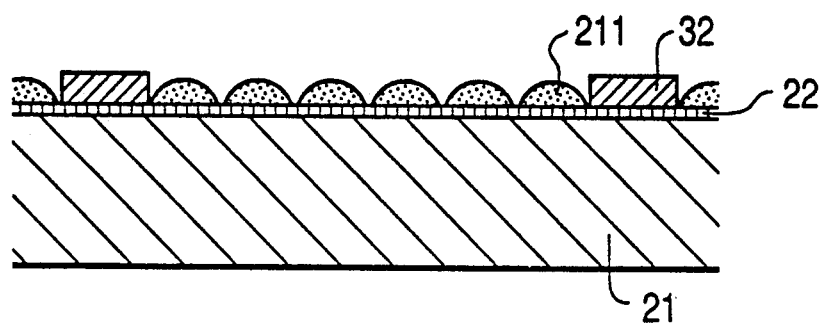
Figure 22:
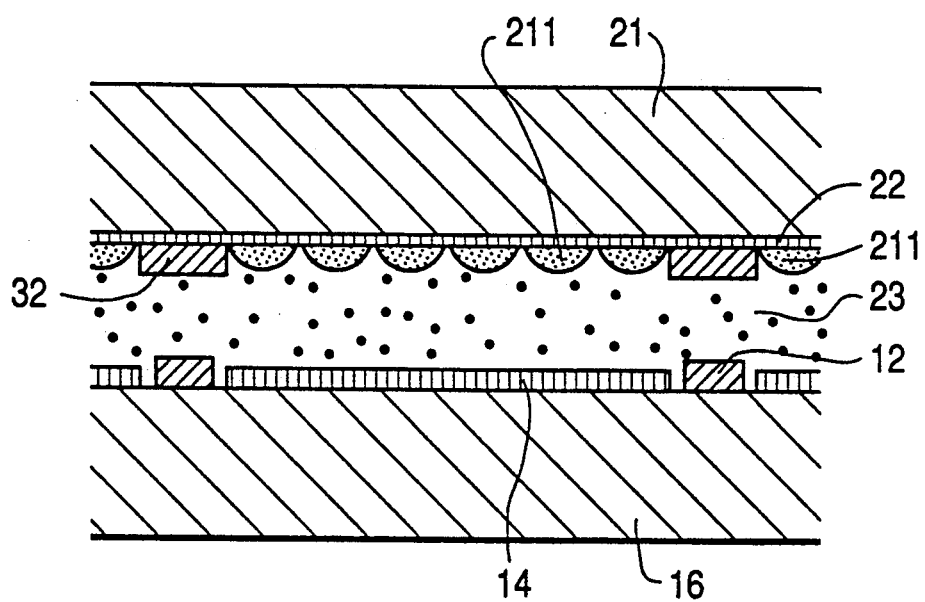
FIG. 22 is a cross-sectional view of a liquid crystal panel showing an example of a third embodiment in accordance with this invention.

A light crystal panel of a third embodiment of this invention will be explained below by referring to the attached drawings. FIG. 21(a) is a top view of a confronting substrate forming the liquid crystal panel of this embodiment, and FIG. 21(b) is a cross-sectional view of the panel taken on the line A—A' of FIG. 21(a). FIG. 22 is a diagram showing the state that an array substrate 16 is mounted confrontingly to the confronting substrate 21 shown in FIG. 21(a) and a polymer dispersed liquid crystal layer 23 is sandwiched between the substrates 21 and 16. On the confronting substrate 21 is formed a transparent electrode 22 made of ITO, and on the confronting electrode 22 is formed a black matrix 32 at a position to confront to a source signal line 12, a gate signal line (not shown) and a TFT (not shown). As a material for forming the black matrix 32, such metals or metal compounds as aluminum and chromium or chromium oxide and an acrylic resin having carbon mixed therein can be typically used. Out of which, it is preferable to make the matrix 32 of chromium from the viewpoint of patterning accuracy and processability. If the black matrix 32 gives no effect on the picture definition, there is no need for it to be formed. On the other hand, on the confronting electrode 22 is formed a convex (micro-lens) 211 made of a transparent material. As the material for this projection, inorganic materials such as $SiO_x$, $SiN_x$, $TaO_x$, glass material or the like, and organic materials such as polyimide resin, ultra-violet ray curing resin or the like can be typically used.

Referring to the selection of material to be used, similar to the first and second embodiments, it is preferable to select them depending on the refractive index np of the polymer of the polymer dispersed liquid crystal layer 23. When the liquid crystal is in the OFF condition, the refractive index $n_a$ of the liquid crystal layer 23 is approximately expressed as $(2n_o+n_e)/3$ in general. When the crystal is in the ON condition, n, becomes $n_o$, or $n_a=n_o$. As a result, in order that the micro-lens 211 appears when it is in the OFF condition and disappears when it is in the ON condition, the refractive index $n_d$ of the micro-lens 211 must be made equal to or approximately equal to the refractive index $n_p$ of the polymer. That is, the refractive index $n_a$ of the liquid crystal layer when it is in the OFF condition is expressed as $(2n_o+n_e)/3$, and thus $n_d \neq n_a$, which means that there occurs a difference in refractive index between the mico-lens 211 and liquid crystal layer 23. On the other hand, since the refractive index $n_a$ of the liquid crystal layer when it is in the ON condition becomes $n_o$, if $n_o = n_p$, the $n_d = n_p$ will result. That is, there occurs no difference in refractive index between the micro-lens 211 and liquid crystal layer 23. The difference between the refractive index nd of the micro-lens 211 and the refractive index $n_p$ of the polymer is preferably in a range of 0.2 or less; it is further preferable to select a material with a difference in refractive index not exceeding 0.1.

A production method of a liquid crystal panel of this invention will be briefly explained below. In this explanation, it is assumed that $SiO_2$ is used as a material for forming the micro-lens 211. First, on the confronting substrate 21 is evaporated a transparent material such as $SiO_2$ or the like. The thickness to be evaporated is set depending on the height of the micro-lens 211 to be formed. Next, a metal such as chromium or the like is evaporated thereon, and the metal evaporated is circularly patterned. Next, the substrate thus processed is immersed into an etching solution. Thus, the etching solution enters between the circularly patterned metal films to dissolve the $SiO_2$. The micro-lens 211 is not necessarily shaped in a circular form, but may be shaped in a trapezoidal form. Finally, the substrate is immersed into a solution to etch a metal, thus removing the metal. As a result, projections made of transparent material are formed thereon.

In the OFF condition of the liquid crystal layer, the refractive index of the liquid crystal 23 is about 1.6. When the micro-lens 211 is made, for example, of $SiO_2$, the refractive index thereof ranges from 1.45 to 1.50 on an approximate basis, so that the incident light is refracted at the boundary surface of the micro-lens 211 and liquid crystal 23 in conformity with Snell's laws of reflection. Besides, since the micro-lenses 211 are formed in a regularly repeated pattern, the diffraction effect occurs, and thus, the light is bent. The proportion and efficiency of refraction and diffraction are varied depending on the wavelength $\lambda$ of the light to be modulated. For example, when a length which is ten times the wavelength $\lambda$ is larger than the pitch of the micro-lenses, the effect of diffraction becomes larger. The light thus bent is scattered while passing through the liquid crystal layer 23. Here, if a condensing lens is disposed on the exit light side so as to collect only the light within a predetermined angle range of $\theta$, the refraction of light be the micro-lens means that the principal ray angle is changed, so that it will be difficult for the condensing lens to collect the light as compared with the case that the micro-lenses are not disposed. As a result, the quantity of transmitted light of the incident light when the liquid crystal is in the OFF condition becomes small.

When the liquid crystal is in the ON condition, the ordinary light refractive index $n_o$ of the liquid crystal becomes about 1.5, which means that it is near the refractive index of $SiO_2$. As a result, the light is not refracted or diffracted substantially at the boundary surface of the micro-lens 211 and liquid crystal 23, thus going straight directly. Accordingly, the contrast ratio will become large. The above explanations are in the case of using $SiO_2$ as the material of forming the micro-lens 211. If the polymer used for forming the liquid crystal layer is used as the forming material of the micro-lens, the ordinary light refractive index $n_o$ of the liquid crystal can be made identical to the refractive index $n_d$ of the micro-lens. As a result, the characteristic of the incident light to go straight when the liquid crystal is in the ON condition can be improved.

Figure 23A:
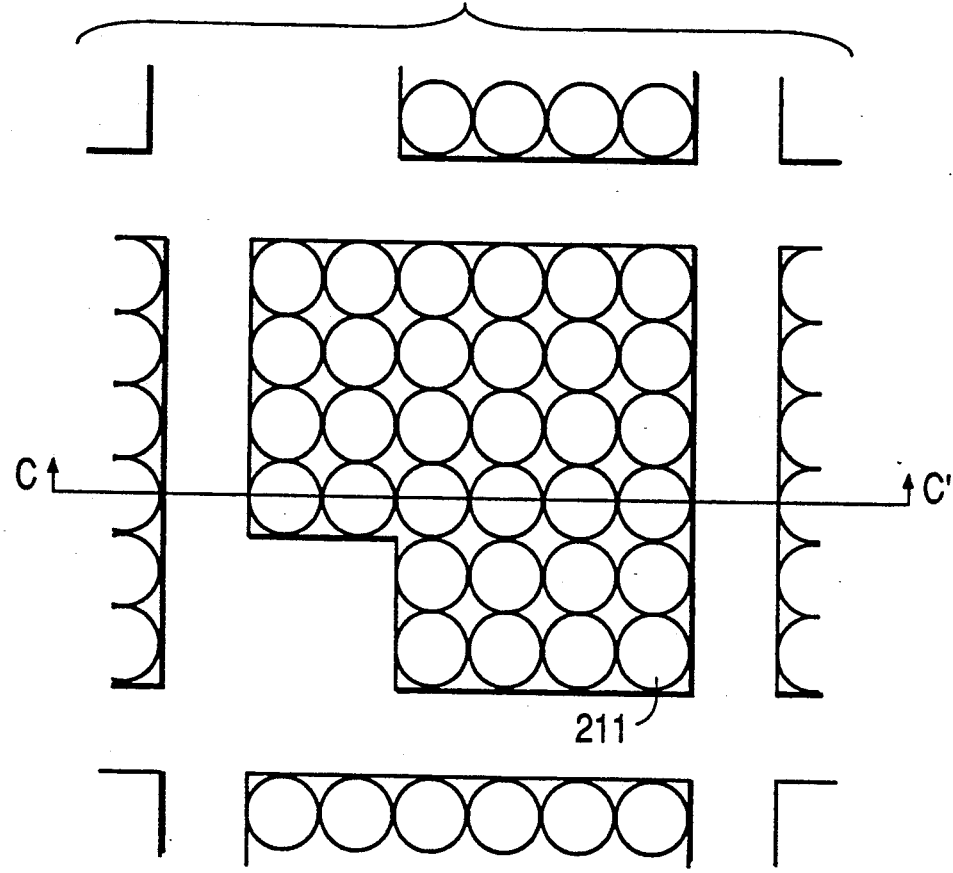
FIGS. 23(a)-23(b) are views of one pixel of a liquid crystal panel showing another example of the third embodiment in accordance with this invention.
Figure 23B:
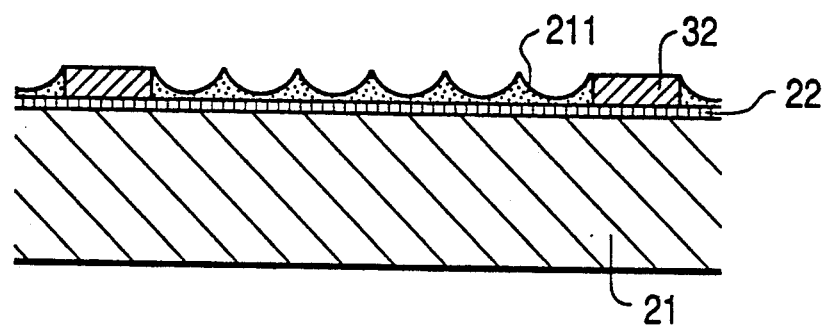

FIGS. 23(a) and 23(b) show a liquid crystal panel showing another example of the third embodiment, in which FIG. 23(b) is a cross-sectional view of the liquid crystal panel taken along the line C—C' of FIG. 23(a). In this example, a micro-lens 211c has a concave surface as shown in FIG. 23(b). With the liquid crystal panel having such a micro-lens 211c as shaped in concave surface, it can be clearly understood that there is no change in effect to make the transmission of light small when the liquid crystal panel is in the OFF condition. In FIGS. 21(a)–21(b) and 23(a)–23(b), the micro-lenses 211 are shown as one independent lens, but are not limited thereto and may be formed in a cylindrical stripe form. Such other structures as shown in the first embodiment can be considered in this embodiment, but explanations thereof have been omitted here.

Figure 24:
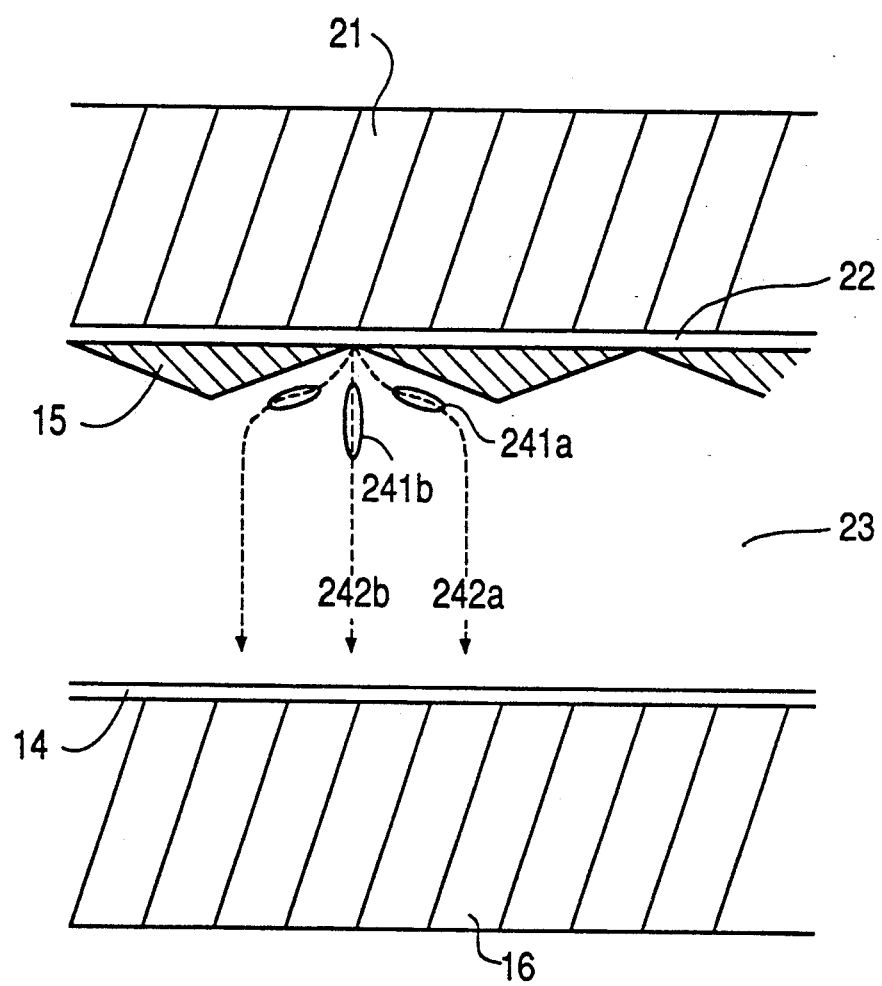
FIG. 24 is a schematic diagram of the electric lines of force within a liquid crystal panel according to a fourth embodiment in accordance with this invention.

Next, a liquid crystal panel according to a fourth embodiment of this invention will be explained below, which is substantially similar in structure to that of the first embodiment. In this embodiment, however, it is necessary for the layer 15 having an irregular sectional surface be different in dielectric constant from the polymer dispersed liquid crystal layer 23, being preferably of a low dielectric constant. The refractive index of the layer 15 having an irregular sectional surface may not be identical to that of the polymer dispersed liquid crystal layer 23, and yet, the same effect can be obtained even if the layer 15 is formed so as not to be concave- or convex-shaped regularly and cyclically. The operation of the liquid crystal panel of this embodiment will be explained below while referring to FIG. 24. In FIG. 24, elements 241a and 241b are liquid crystal molecules and elements 242a and 242b are electric lines of force. FIG. 24 shows the state that a voltage for initiating the liquid crystal molecules to align to the confronted electrode (hereinafter called an alignment initiating voltage) is applied thereto. The alignment initiating voltage depends on the thickness of the liquid crystal layer 23 and the thickness and pitch of the low dielectric constant film 15, ranging from 0 to 3V in general. If a voltage is applied, electric lines of force are developed in the liquid crystal layer. Also, for the sake of simplifying the explanations, the electric lines of force are directed from the confronting electrode 22 to the pixel electrode 14. A voltage drop occurs in the low dielectric constant film 15, so that the number of electric lines of force passing through the film 15 becomes small. The electric lines of force pass through the liquid crystal layer depending on the dielectric constant. As a result, the electric lines of force from the confronting electrode 22 are directed from the layer between the adjacent low dielectric constant films 15 to the pixel electrode 14 while expanding. The liquid crystal molecules are aligned in the direction of the electric lines of force. The liquid crystal molecule 241b at the central position of the layer between the adjacent low dielectric constant films 15 is aligned in the perpendicular direction, and thus, the refractive index becoming $n_p$. Since the electric lines of force 242a are curved, the liquid crystal molecule 241a is aligned so as to be slanted with respect to the normal axis of the electrode substrate. As a result, the refractive index thereof becomes intermediate of $n_x = (2n_o + n_c)/3$ and $(n_o + n_c)/2$. Accordingly, when the alignment initiating voltage is applied, the refractive index of the liquid crystal layer is increased as the whole, and the difference $\Delta n$ in refractive index from the polymer becomes large, resulting in an improvement in the scattering characteristic. The liquid crystal panel is driven by applying a voltage in a range of alignment initialing voltage and transmission voltage to the pixel electrode. By applying the alignment initiating voltage, the scattering characteristic can be more improved than when it is not applied, so that the contrast can be increased. A liquid crystal projection apparatus using the liquid crystal panel of this embodiment is the same as that shown in FIG. 12, and the explanation thereof has been omitted.

What is claimed is:

1. A liquid crystal panel comprising:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an array of microlenses formed on a surface of an electrode provided on at least one of said first and second substrates;
wherein a difference between a refractive index $n_p$ of said polymer and a refractive index $n_I$ of said irregular surface layer is 0.1 or less;
wherein the irregular sectional surface and polymer dispersed liquid crystal cooperate to form a diffraction grating when the polymer dispersed liquid crystal is in a scattering state and no diffraction grating when the liquid crystal is in a transmissive state.

2. A liquid crystal panel according to claim 1, wherein said refractive index $n_I$ of said irregular surface layer is substantially identical to one of an ordinary light refractive index $n_o$ and an extraordinary light refractive index of said liquid crystal material and a refractive index $n_x$ of said liquid crystal polymer dispersed liquid crystal layer.

3. A liquid crystal panel according to claim 1, wherein said irregular surface layer is formed of a light transmissive material.

4. A liquid crystal panel according to claim 1, wherein said irregular surface layer is formed of an optically isotropic material.

5. A liquid crystal panel according to claim 1, wherein said irregular surface layer has a rectangular shaped sectional surface.

6. A liquid crystal panel according to claim 1, wherein said irregular surface layer is of a stripe form.

7. A liquid crystal panel according to claim 1, wherein said irregular surface layer is of a columnar convex projection.

8. A liquid crystal panel according to claim 1, wherein said irregular surface layer has a concave portion where an electrode is exposed and a convex portion.

9. A liquid crystal panel according to claim 1, wherein said irregular surface layer has a concave and convex portions which are cylindrically formed at a pitch of 15 $\mu$m or less.

10. A liquid crystal panel according to claim 1, wherein said irregular surface layer has convex portions each having a height ranging from 1 to 10 $\mu$m.

11. A liquid crystal panel according to claim 1, wherein said irregular surface layer has convex portions each having a slant surface at an angle ranging from 0 to 45 degrees with respect to a normal line of a corresponding substrate.

12. A liquid crystal panel according to claim 1, wherein said polymer dispersed liquid crystal layer has a thickness ranging from 5 to 25 $\mu$m.

13. A liquid crystal panel according to claim 1, wherein said irregular surface layer is identical in dielectric constant to said liquid crystal material.

14. A liquid crystal projection apparatus comprising:
at least one liquid crystal panel for modulating a light which enters therein;
a light emitting means for emitting light;
a first optical means for guiding said light emitted from said light emitting means to said liquid crystal panel; and
a second optical means for projecting a modulated light outputted from said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an irregular sectional surface formed on a surface of an electrode provided on at least one of said first and second substrates;
wherein a difference between a refractive index $n_p$ of said polymer and a refractive index $n_I$ of said irregular surface layer is 0.1 or less;
wherein the irregular sectional surface and polymer dispersed liquid crystal cooperate to form a diffraction grating when the polymer dispersed liquid crystal is in a scattering state and no diffraction grating when the liquid crystal is in a transmissive state.

15. A liquid crystal panel comprising:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an irregular sectional surface formed on a surface of an electrode provided on at least one of said first and second substrates, said irregular surface layer being made of the same material as said polymer of said polymer dispersed liquid crystal layer;
wherein the irregular sectional surface and polymer dispersed liquid crystal cooperate to form a diffraction grating when the polymer dispersed liquid crystal is in a scattering state and no diffraction grating when the liquid crystal is in a transmissive state.

16. A liquid crystal panel according to claim 15, wherein a refractive index $n_I$ of said irregular surface layer is substantially identical to one of an ordinary light refractive index $n_o$ and an extraordinary light refractive index of the liquid crystal material and a refractive index $n_x$ of the liquid crystal polymer dispersed liquid crystal layer.

17. A liquid crystal panel according to claim 15, wherein said irregular surface layer is formed of a light transmissive material.

18. A liquid crystal panel according to claim 15, wherein said irregular surface layer is formed of an optically isotropic material.

19. A liquid crystal panel according to claim 15, wherein said irregular surface layer has a rectangular shaped sectional surface.

20. A liquid crystal panel according to claim 15, wherein said irregular surface layer is of a stripe form.

21. A liquid crystal panel according to claim 15, wherein said irregular surface layer is of a columnar convex projection.

22. A liquid crystal panel according to claim 15, wherein said irregular surface layer has a concave portion where an electrode is exposed and a convex portion.

23. A liquid crystal panel according to claim 15, wherein said irregular surface layer has a concave and convex portions which are cyclically formed at a pitch of 15 $\mu$m or less.

24. A liquid crystal panel according to claim 15, wherein said irregular surface layer has convex portions each having a height ranging from 1 to 10 $\mu$m.

25. A liquid crystal panel according to claim 15, wherein said irregular surface layer has convex portions each having a slant surface at an angle ranging from 0 to 45 degrees with respect to the normal line of the corresponding substrate.

26. A liquid crystal panel according to claim 15, wherein said polymer dispersed liquid crystal layer has a thickness ranging from 5 to 25 $\mu$m.

27. A liquid crystal projection apparatus comprising:
at least one liquid crystal panel for modulating a light which enters therein;
a light emitting means for emitting light;
a first optical means for guiding light emitted from said light emitting means to said liquid crystal panel; and
a second optical means for projecting a modulated light outputted from said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an irregular sectional surface formed on a surface of an electrode provided on at least one of said first and second substrates, said irregular surface layer being made of the same material as said polymer of said polymer dispersed liquid crystal layer;
wherein the irregular sectional surface and polymer dispersed liquid crystal cooperate to form a diffraction grating when the polymer dispersed liquid crystal is in a scattering state and no diffraction grating when the liquid crystal is in a transmissive state.

28. A liquid crystal panel comprising:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and liquid crystal material dispersed in said polymer, said polymer dispersed liquid crystal layer satisfying at least one of the following conditions: said polymer dispersed liquid crystal layer has a thickness smaller than 5 $\mu$m; said liquid crystal material dispersed in said polymer is in the form of particles whose average size or average void space is smaller than 1 $\mu$m and a mixing ratio of said liquid crystal material in said polymer dispersed liquid crystal layer is 90% or more; and
an irregular surface layer having an irregular sectional surface formed on a surface of an electrode provided on at least one of said first and second substrates;
wherein the irregular sectional surface and polymer dispersed liquid crystal cooperate to form a diffraction grating when the polymer dispersed liquid crystal is in a scattering state and no diffraction grating when the liquid crystal is in a transmissive state.

29. A liquid crystal panel according to claim 28, wherein said irregular surface layer has convex portions each having a height which is substantially identical to the thickness of said polymer dispersed liquid crystal layer.

30. A liquid crystal panel according to claim 28, wherein a refractive index $n_t$ of said irregular surface is substantially identical to one of an ordinary light refractive index $n_o$ and an extraordinary light refractive index of said liquid crystal material and a refractive index $n_x$ of the liquid crystal polymer dispersed liquid crystal layer.

31. A liquid crystal panel according to claim 28, wherein a difference between the refractive index $n_t$ of said irregular surface layer and a refractive index $n_p$ of said polymer is 0.1 or less.

32. A liquid crystal panel according to claim 28, wherein said irregular surface layer is formed of the same material as said polymer.

33. A liquid crystal projection apparatus comprising:
at least one liquid crystal panel for modulating light which enters therein;
a light emitting means for emitting light;
a first optical means for guiding said light emitted from said light emitting means to said liquid crystal panel; and
a second optical means for projecting a modulated light outputted from said liquid crystal panel, said second optical means including an output aperture for blocking light which has been undiffracted by said liquid crystal panel and for passing only light which has been diffracted by said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and liquid crystal material dispersed in said polymer, said polymer dispersed liquid crystal layer satisfying at least one of the following conditions: said polymer dispersed liquid crystal layer has a thickness smaller than 5 µm; said liquid crystal material dispersed in said polymer is in the form of particles whose average size or average void space is smaller than 1 µm and a mixing ratio of said liquid crystal material in said polymer dispersed liquid crystal layer is 90% or more; and an irregular surface layer having an irregular sectional surface formed on a surface of an electrode provided on at least one of said first and second substrates;

wherein the irregular sectional surface and polymer dispersed liquid crystal cooperate to form a diffraction grating when the polymer dispersed liquid crystal is in a scattering state and no diffraction grating when the liquid crystal is in a transmissive state.

34. A liquid crystal projection apparatus according to claim 33, wherein said first and second optical means forms a Schlieren optical system.

35. A liquid crystal projection apparatus according to claim 33, wherein said at least one liquid crystal panel comprises a plurality of liquid crystal panels each being different in at least one of height and pitch of said irregular surface layer from at least one of the remaining liquid crystal panels.

36. A liquid crystal projection apparatus comprising:
at least one liquid crystal panel for modulating a light which enters therein;
a light emitting means for emitting light;
a first optical means for guiding light emitted from said light emitting means to said liquid crystal panel; and
a second optical means for projecting a modulated light outputted from said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an array of microlenses formed on a surface of an electrode provided on at least one of said first and second substrates;
wherein the irregular sectional surface and polymer dispersed liquid crystal cooperate to form a diffraction grating when the polymer dispersed liquid crystal is in a scattering state and no diffraction grating when the liquid crystal is in a transmissive state.

37. A liquid crystal panel according to claim 36, wherein each of said array of microlenses is one of a concave lens and a convex lens.

38. A liquid crystal projection apparatus comprising:
at least one liquid crystal panel for modulating a light which enters therein;
a light emitting means for emitting light;
a first optical means for guiding light emitted from said light emitting means to said liquid crystal panel; and
a second optical means for projecting a modulated light outputted from said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an array of microlenses formed on a surface of an electrode provided on at least one of said first and second substrates;
wherein the irregular sectional surface and polymer dispersed liquid crystal cooperate to form a diffraction grating when the polymer dispersed liquid crystal is in a scattering state and no diffraction grating when the liquid crystal is in a transmissive state.

39. A liquid crystal panel comprising:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an irregular sectional surface formed on a surface of an electrode provided on at least one of said first and second substrates;
wherein a difference between a refractive index $n_p$ of said polymer and a refractive index $n_i$ of said irregular surface layer is 0.1 or less;
wherein the irregular sectional surface forms a two dimensional diffraction grating.

40. A liquid crystal projection apparatus comprising:
at least one liquid crystal panel for modulating a light which enters therein;
a light emitting means for emitting light;
a first optical means for guiding said light emitted from said light emitting means to said liquid crystal panel; and
a second optical means for projecting a modulated light outputted from said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an irregular sectional surface formed on a surface of an electrode provided on at least one of said first and second substrates;
wherein a difference between a refractive index $n_p$ of said polymer and a refractive index $n_i$ of said irregular surface layer is 0.1 or less;
wherein the irregular sectional surface forms a two dimensional diffraction grating.

41. A liquid crystal panel comprising:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an irregular sectional surface formed on a surface of an electrode provided on at least one of said first and second substrates, said irregular surface layer being made of the same material as said polymer of said polymer dispersed liquid crystal layer;
wherein the irregular sectional surface forms a two dimensional diffraction grating.

42. A liquid crystal projection apparatus comprising:
at least one liquid crystal panel for modulating a light which enters therein;
a light emitting means for emitting light;
a first optical means for guiding said light emitted from said light emitting means to said liquid crystal panel; and
a second optical means for projecting a modulated light outputted from said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an irregular sectional surface formed on a surface of an electrode provided on at least one of said first and second substrates, said irregular surface layer being made of the same material as said polymer of said polymer dispersed liquid crystal layer;
wherein the irregular sectional surface forms a two dimensional diffraction grating.

43. A liquid crystal panel comprising:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and liquid crystal material dispersed in said polymer, said polymer dispersed liquid crystal layer satisfying at least one of the following conditions: said polymer dispersed liquid crystal layer has a thickness smaller than 5 $\mu$m; said liquid crystal material dispersed in said polymer is in the form of particles whose average size or average void space is smaller than 1 $\mu$m and a mixing ratio of said liquid crystal material in said polymer dispersed liquid crystal layer is 90% or more; and
an irregular surface layer having an irregular sectional surface formed on a surface of an electrode provided on at least one of said first and second substrates;
wherein the irregular sectional surface forms a two dimensional diffraction grating.

44. A liquid crystal projection apparatus comprising:
at least one liquid crystal panel for modulating light which enters therein;
a light emitting means for emitting light;
a first optical means for guiding said light emitted from said light emitting means to said liquid crystal panel; and
a second optical means for projecting a modulated light outputted from said liquid crystal panel, said second optical means including an output aperture for blocking light which has been undiffracted by said liquid crystal panel and for passing only light which has been diffracted by said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and liquid crystal material dispersed in said polymer, said polymer dispersed liquid crystal layer satisfying at least one of the following conditions: said polymer dispersed liquid crystal layer has a thickness smaller than 5 $\mu$m; said liquid crystal material dispersed in said polymer is in the form of particles whose average size or average void space is smaller than 1 $\mu$m and a mixing ratio of said liquid crystal material in said polymer dispersed liquid crystal layer is 90% or more; and
an irregular surface layer having an irregular sectional surface formed on a surface of an electrode provided on at least one of said first and second substrates;
wherein the irregular sectional surface forms a two dimensional diffraction grating.

45. A liquid crystal projection apparatus comprising:
at least one liquid crystal panel for modulating light which enters therein;
a light emitting means for emitting light;
a first optical means for guiding said light emitted from said light emitting means to said liquid crystal panel; and
a second optical means for projecting a modulated light outputted from said liquid crystal panel;
wherein said liquid crystal panel comprises:
a first substrate and a second substrate which confront each other, at least one of said substrates being light transmissible;
electrode layers respectively formed on confronting surfaces of said first and second substrates;
a polymer dispersed liquid crystal layer sandwiched between said first and second substrates and comprising a polymer and a liquid crystal material dispersed in said polymer; and
an irregular surface layer having an array of microlenses formed on a surface of an electrode provided on at least one of said first and second substrates;
wherein the irregular sectional surface forms a two dimensional diffraction grating.

46. A liquid crystal projection apparatus comprising:
at least one liquid crystal panel for modulating a light which enters therein;
a light emitting means for emitting light;

a first optical means for guiding said light emitted from said light emitting means to said liquid crystal panel; and a second optical means for projecting a modulated light outputted from said liquid crystal panel;

wherein said liquid crystal panel comprises:

a first substrate and a second substrate which confront each other, at least one of said substrates being light transmissible;

electrode layers respectively formed on confronting surfaces of said first and second substrates;

a polymer dispersed liquid crystal layer sandwiched between said first and second substrates and comprising a polymer and liquid crystal material dispersed in said polymer; and an irregular surface layer having an array of microlenses formed on a surface of an electrode provided on at least one of said first and second substrates;

wherein the irregular sectional surface forms a two dimensional diffraction grating.

* * * * *